(12) United States Patent
Osaka et al.

(10) Patent No.: US 8,973,387 B2
(45) Date of Patent: Mar. 10, 2015

(54) VEHICULAR AIR CONDITIONING SYSTEM

(75) Inventors: Tadashi Osaka, Kashiwa (JP); Hiroaki Matsushima, Seika (JP); Sachio Sekiya, Hitachinaka (JP); Yuto Imanishi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 741 days.

(21) Appl. No.: 13/205,675

(22) Filed: Aug. 9, 2011

(65) Prior Publication Data
US 2012/0037352 A1    Feb. 16, 2012

(30) Foreign Application Priority Data

Aug. 11, 2010   (JP) .................................. 2010-179925

(51) Int. Cl.
*B60H 1/32* (2006.01)
*B60H 1/00* (2006.01)
(Continued)

(52) U.S. Cl.
CPC ........ *B60H 1/00021* (2013.01); *B60H 1/00278* (2013.01); *B60H 1/00385* (2013.01); *B60H 1/00907* (2013.01); *B60L 1/003* (2013.01); *B60L 1/02* (2013.01); *B60L 3/003* (2013.01); *B60L 3/0061* (2013.01); *B60L 11/1803* (2013.01); *B60L 11/1805* (2013.01); *B60L 11/1874* (2013.01); *B60L 11/1875* (2013.01); *B60H 2001/00178* (2013.01);
(Continued)

(58) Field of Classification Search
CPC ........... B60H 1/00007; B60H 1/00021; B60H 1/00028; B60H 1/0005; B60H 1/00385; B60H 1/00899; B60H 1/00907; B60H 1/00278; B60H 1/00307; B60H 2001/00928; B60H 2001/00935; B60H 2001/00949

USPC ................... 62/79, 160, 238.7, 239, 244, 277
See application file for complete search history.

(56) References Cited

U.S. PATENT DOCUMENTS 555,336 A    2/1896  Roche
555,366 A    2/1896  Fauber
(Continued)

FOREIGN PATENT DOCUMENTS

JP    2005-273998 A    10/2005
JP    2008-230594 A    10/2008
(Continued)

OTHER PUBLICATIONS

Chinese Office Action dated Oct. 9, 2013 (seven (7) pages).
(Continued)

*Primary Examiner* — Jonathan Bradford
(74) *Attorney, Agent, or Firm* — Crowell & Moring LLP

(57) ABSTRACT

A vehicular air conditioning system capable of suppressing the power consumption of a refrigerating cycle is disclosed. The vehicular air conditioning system comprises a refrigerating cycle circuit comprising a compressor, an outside heat exchanger and an inside air conditioning heat exchanger annularly connected in order, and a device cooling circuit comprising a heating unit, an inside cooling heat exchanger, an intermediate heat exchanger and a pump being annularly connected, the intermediate heat exchanger being constructed such that one end of a piping of the cooling medium for air conditioning is connected to a liquid piping, the liquid piping providing connection between the outside heat exchanger and the inside air conditioning heat exchanger, and an opposite end of the piping of the cooling medium for air conditioning is connected to a suction port of the compressor.

20 Claims, 20 Drawing Sheets

(51) Int. Cl.
  *B60L 1/00* (2006.01)
  *B60L 1/02* (2006.01)
  *B60L 3/00* (2006.01)
  *B60L 11/18* (2006.01)

(52) U.S. Cl.
  CPC ............ *B60H 2001/00307* (2013.01); *B60H 2001/00928* (2013.01); *B60H 2001/00935* (2013.01); *B60H 2001/00949* (2013.01); *B60L 2200/26* (2013.01); *B60L 2200/40* (2013.01); *B60L 2240/12* (2013.01); *B60L 2240/34* (2013.01); *B60L 2240/36* (2013.01); *B60L 2240/545* (2013.01); *B60L 2250/26* (2013.01)
  USPC .............. 62/244; 62/79; 62/160; 62/238.7; 62/277

(56) References Cited

U.S. PATENT DOCUMENTS

| | | | |
|---|---|---|---|
| 5,553,661 A | 9/1996 | Beyerlein et al. | |
| 6,119,473 A * | 9/2000 | Kishita et al. | 62/228.4 |
| 8,517,087 B2 * | 8/2013 | Zeigler et al. | 165/202 |
| 2005/0082052 A1 | 4/2005 | Abdeljawad | |
| 2005/0133215 A1 | 6/2005 | Ziehr et al. | |
| 2010/0000713 A1 | 1/2010 | Takahashi et al. | |
| 2010/0012295 A1 | 1/2010 | Nemesh et al. | |
| 2010/0107673 A1 * | 5/2010 | Nakaguro et al. | 62/271 |
| 2010/0126197 A1 * | 5/2010 | Nakaguro | 62/271 |
| 2011/0072841 A1 | 3/2011 | Arai et al. | |
| 2011/0106358 A1 | 5/2011 | Sawada et al. | |
| 2011/0113800 A1 | 5/2011 | Sekiya et al. | |

FOREIGN PATENT DOCUMENTS

| JP | 4285292 B2 | 4/2009 |
|---|---|---|
| JP | 2011-105150 A | 6/2011 |
| JP | 2011-105151 A | 6/2011 |
| JP | 2011-111139 A | 6/2011 |
| JP | 2011-111140 A | 6/2011 |
| JP | 2011-112312 A | 6/2011 |

OTHER PUBLICATIONS

European Search Report dated Nov. 25, 2011 (seven (7) pp.).

* cited by examiner

FIG. 17

| VEHICLE ROOM INTERIOR | MOTOR | INVERTER | BATTERY | GEAR BOX |
|---|---|---|---|---|
| ·ROOM COOLING/HEATING AND DEHUMIDIFYING<br>·ROOM COOLING MAY BE STOPPED OR WEAKENED TO COOL THE HEATING UNIT. | ·COOLING ONLY<br>·HIGH TORQUE OUTPUT TIME IS PROLONGED BY COOLING.<br>·DEVICE COOLING MEDIUM TEMP. 60°C OR LOWER | ·COOLING ONLY<br>·HIGH TORQUE OUTPUT TIME IS PROLONGED BY COOLING.<br>·DEVICE COOLING MEDIUM TEMP. 60°C OR LOWER | ·WARM-UP/COOLING<br>·CHARGE/DISCHARGE EFFICIENCY IS IMPROVED BY MAINTAINING THE BATTERY TEMP. WITHIN A PREDETERMINED TEMP. RANGE. | ·WARM-UP IN STARTING (ESPECIALLY IN WINTER)<br>·NO COOLING FROM THE AIR CONDITIONING SYSTEM. REMOVE WASTE HEAT<br>·WHEN LUBRICATING OIL TEMP. IS LOW, GEAR AGITATION LOSS IS LARGE.<br>·WHEN LUBRICATING OIL TEMP. IS HIGH, OIL FILM CANNOT BE FORMED ON GEAR MATING SURFACES AND FRICTION LOSS IS LARGE. |

FIG. 21

| | | COMPONENT | | | | |
|---|---|---|---|---|---|---|
| | | VEHICLE ROOM INTERIOR | MOTOR | INVERTER | BATTERY | GEAR BOX |
| VEHICLE CONDITIONS | CHARGE | × | × | × | → WARM-UP/ COOLING TO A PREDETERMINED TEMP. RANGE | × |
| | BEFORE RUNNING START | → ROOM COOLING AND HEATING WITH AC POWER SUPPLY | × | × | → WARM-UP/ COOLING TO A PREDETERMINED TEMP. RANGE | → WARM-UP IN CASE OIL TEMP. IS LOW |
| | BEFORE TAKE OFF | → | → | → | → WARM-UP/ COOLING TO A PREDETERMINED TEMP. RANGE | → WARM-UP IN CASE OIL TEMP. IS LOW |
| | ACCELERA- TION, DE- CELERATION, AND BEFORE AND DURING MOUNTAIN PATH RUNNING | → or BECOMES WEAK IN ROOM COOLING BECOMES STRONG IN ROOM HEATING | ↓ | ↓ | → WARM-UP/ COOLING TO A PREDETERMINED TEMP. RANGE | → RECOVER WASTE HEAT |
| | ORDINARY ROAD RUNNING | → | → | → | → | → |
| | BEFORE AND DURING EXPRESSWAY RUNNING | → or BECOMES WEAK IN ROOM COOLING BECOMES STRONG IN ROOM HEATING | ↓ | ↓ | → WARM-UP/ COOLING TO A PREDETERMINED TEMP. RANGE | → RECOVER WASTE HEAT |
| | BEFORE TEMPORARY STOP (WAITING UNTIL THE TRAFFIC LIGHT TURNS GREEN, TRAFFIC CONGESTION) | → | ↑ | ↑ | ↑↓ | → RECOVER WASTE HEAT |
| | BEFORE STOP | × or WEAKEN | ↑ | ↑ | ↑↓ | × |
| | STOP | × | × | × | × | × |

× : NO ROOM COOLING/HEATING OR COOLING/WARM-UP
↑ : RAISE SET TEMP.
↓ : REDUCE SET TEMP.
→ : NO SET TEMP. CHANGE
↑↓ : WIDEN SET TEMP. RANGE

※ RETURN CHANGED SET TEMP. TO THE ORIGINAL SET TEMP. UPON CHANGE OF VEHICLE CONDITION

VEHICULAR AIR CONDITIONING SYSTEM

CLAIM OF PRIORITY

The present application claims priority from Japanese Patent Application No. 2010-179925 filed on Aug. 11, 2010, the content of which is hereby incorporated by reference into this application.

BACKGROUND OF THE INVENTION

1. Field of the Invention

The present invention relates to a vehicular air conditioning system.

2. Description of the Related Art

A system is known which utilizes the heat generated from a heating unit such as, for example, an inverter circuit mounted on a vehicle for air conditioning.

For example, in Japanese Patent No. 4285292 (Patent Document 1), in connection with a refrigerating cycle apparatus having a cooling circuit for cooling an in-vehicle heating unit with a cooling medium which is circulated by a cooling medium circulating pump and also having an evaporator which absorbs heat from the cooling medium present in the cooling circuit, there is disclosed a technique related to a method for operating a vehicular cooling system, the vehicular cooling system having in the cooling circuit an inside air conditioning heat exchanger for heat exchange between the cooling medium and air blown off to the interior of a vehicle room. In Patent Document 1, both device cooling and room cooling can be done at a time by using a refrigerating cycle.

In Japanese Patent Laid-Open No. 2008-230594 (Patent Document 2) is disclosed a technique of heating air for air conditioning by both heat generated in a heat pump type cooling apparatus and heat generated with a heater, during room heating. Patent Document 2 discloses that in a vehicle not having such a large heat source as an engine, a sufficient room heating performance can be achieved even when the outside air temperature is extremely low.

In case of performing both heating unit cooling and room cooling at a time using a refrigerating cycle, the prior art involves the problem that the cooling medium temperature cannot always be controlled to a temperature appropriate for both air conditioning load and heating unit, because the prior art is of the construction in which the same cooling medium is supplied to both heating unit and heat exchanger for air conditioning. Therefore, for example when it is necessary to cool the cooling medium to 10° C. or so to effect room cooling, the cooling medium flowing to the heating unit is also cooled to 10° C. or so.

When the heating unit temperature becomes lower than the outside air temperature, heat flows from the outside air to the heating unit, thus giving rise to the necessity that cooling be done extra by an amount corresponding to such input heat in the refrigerating cycle. Thus, there has been the inconvenience that the power consumption in the refrigerating cycle increases.

Moreover, in a certain particular condition there is a fear of dew formation in the interior of the heating unit, thus giving rise to the necessity of taking a measure against dew formation.

According to the construction of Patent Document 2, when making room heating, a cooling medium flowing to a heat exchanger for air conditioning is heated by both a heater and a water-cooled condenser in a refrigerating cycle. Therefore, the condensation temperature in the water-cooled condenser is influenced by the temperature of the cooling medium.

In case of using a heater, the cooling medium temperature rises, so that the condensation temperature in the water-cooled condenser also rises. Once the condensation temperature rises, the power consumption for ensuring the same room heating capacity increases. Thus, in case of using a heater, there has been the problem that the power consumption in the refrigerating cycle also increases, in addition to the power consumption of the heater.

It is an object of the present invention to solve the above-mentioned problems and provide a vehicular air conditioning system with less power consumption.

SUMMARY OF THE INVENTION

According to the present invention, for solving the above-mentioned problems, there is provided a vehicular air conditioning system comprising: a refrigerating cycle circuit, the refrigerating cycle circuit comprising a compressor for compressing a cooling medium for air conditioning, an outside heat exchanger for heat exchange between the cooling medium for air conditioning and outside air, and an inside air conditioning heat exchanger for heat exchange with air to be blown off to the interior of a vehicle room, the compressor, the outside heat exchanger and the inside air conditioning heat exchanger being annularly connected in order; and a device cooling circuit, the device cooling circuit comprising a heating unit, an inside cooling heat exchanger for heat exchange with air to be blown off to the interior of the vehicle room, an intermediate heat exchanger for heat exchange between a device cooling medium for cooling the heating unit and the cooling medium for air conditioning present in the refrigerating cycle circuit, and a pump for circulating the device cooling medium, the heating unit, the inside cooling heat exchanger, the intermediate heat exchanger and the pump being annularly connected, the intermediate heat exchanger being constructed such that one end of a piping of the cooling medium for air conditioning is connected to a liquid piping, the liquid piping providing connection between the outside heat exchanger and the inside air conditioning heat exchanger, and an opposite end of the piping of the cooling medium for air conditioning is connected to a suction port of the compressor.

The inside air conditioning heat exchanger and the intermediate heat exchanger are each provided, in a piping route of the cooling medium for air conditioning connected to the liquid piping, with flow rate control means for air conditioning to make variable the flow rate of the cooling medium for air conditioning flowing to each of the heat exchangers and flow rate control means for cooling.

Outside flow rate control means for making variable the flow rate of the cooling medium for air conditioning is disposed in a piping route of the cooling medium for air conditioning, the piping route providing connection between the outside heat exchanger and the liquid piping.

The outside heat exchanger, the inside air conditioning heat exchanger and the intermediate heat exchanger are connected in an arbitrarily switchable manner to a discharge port or the suction port of the compressor through first flow path switching means and second flow path switching means.

The case where the air to be blown off to the interior of the vehicle room passes through the inside cooling heat exchanger after passing through the inside air conditioning heat exchanger and the case where the air to be blown off to the interior of the vehicle room passes through the inside air conditioning heat exchanger after passing through the inside cooling heat exchanger can be switched from one to the other.

The case where the air passing through the inside cooling heat exchanger blows off to the interior of the vehicle room and the case where the air blows off to the exterior of the vehicle can be switched from one to the other.

The device cooling circuit includes a main circuit with the device cooling medium flowing in the inside cooling heat exchanger, a bypass circuit with the device cooling medium flowing while bypassing the inside cooling heat exchanger, and flow rate control means for controlling the flow rate of the device cooling medium flowing in both the main circuit and the bypass circuit.

According to the present invention it is possible to provide a vehicular air conditioning system capable of suppressing the power consumption in a refrigerating cycle.

BRIEF DESCRIPTION OF THE DRAWINGS

FIG. 17 is a diagram showing a relation between the outside air temperature and air conditioning for a vehicle room and devices;

FIG. 21 is a diagram showing various vehicle conditions and examples of changing temperatures set for objects to be temperature-controlled (the interior of the vehicle room and the devices to be temperature-controlled)

DETAILED DESCRIPTION OF A PREFERRED EMBODIMENT

The following description is now provided about a vehicular air conditioning system according to an embodiment of the present invention which is applied to an electric car. The present invention is applicable not only to electric cars but also to motor-driven vehicles such as hybrid cars, electric railroads and construction vehicles.

In the following embodiment reference will be made as an example to an AC motor driven by an inverter, but in the present invention no limitation is made to the AC motor and the invention is applicable to all kinds of rotating electric machines (motor-generators), including DC motors driven by a converter such as, for example, thyristor leonard devices, and pulse motors driven by a chopper power supply.

Figure 1:
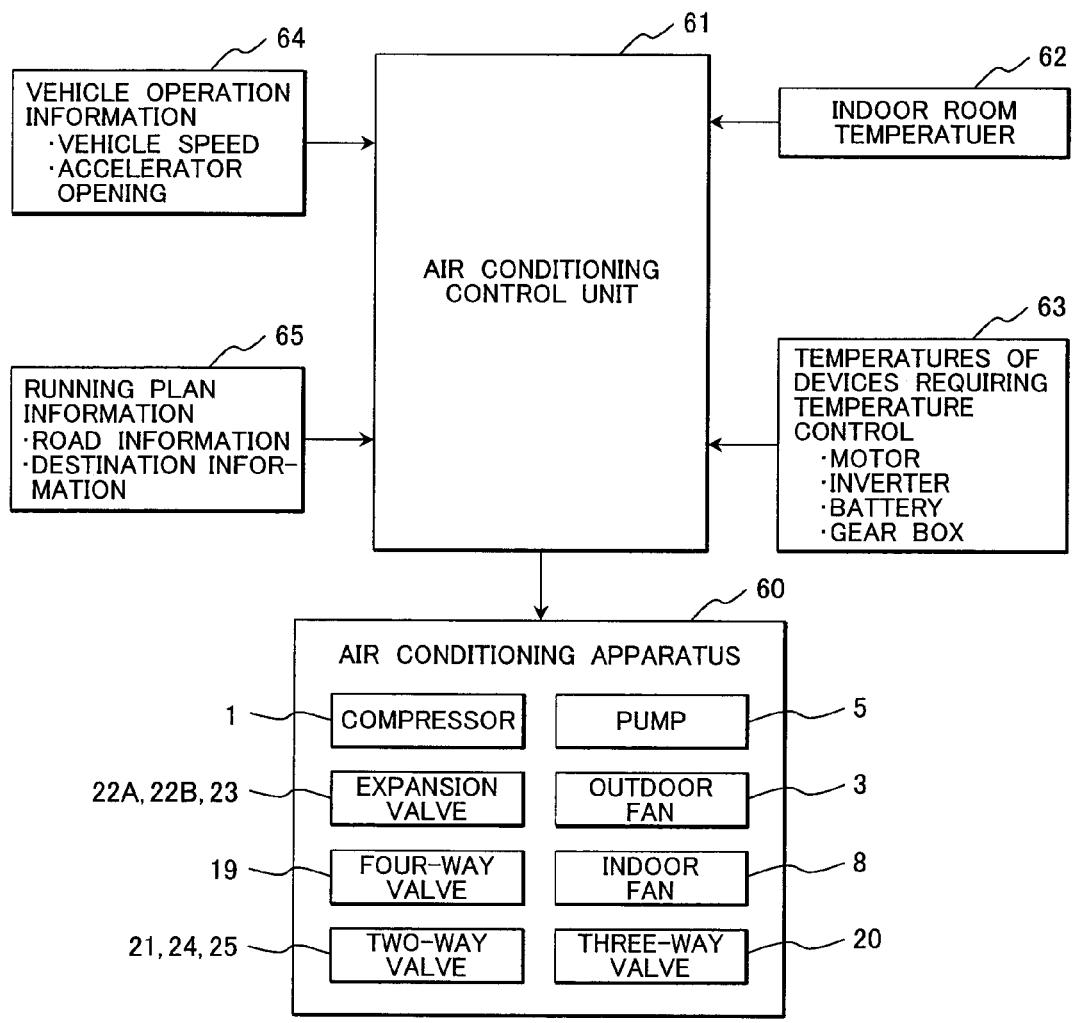
FIG. 1 is a diagram showing a schematic construction of a vehicular air conditioning system according to the present invention.

FIG. 1 is a diagram showing a schematic construction of a vehicular air conditioning system embodying the present invention. The vehicular air conditioning system shown in FIG. 1 includes an air conditioning apparatus 60 to perform cooling and heating, for a vehicle room and devices requiring temperature control, and an air conditioning control unit 61 for controlling the air conditioning apparatus 60. Various actuators provided in the air conditioning apparatus 60 are controlled with control signals provided from the air conditioning control unit 61.

Actuators related to this embodiment are a compressor 1, expansion valves 22A, 22B, 23 as flow rate control means, a four-way valve 19 as first flow path switching means, a three-way valve 20 as second flow path switching means, two-way valves 21, 24, 25, a circulating pump 5, an outside fan 3 and an inside fan 8.

With temperature sensors, an inside temperature 62 and temperatures 63 of devices requiring temperature control are inputted to the air conditioning control unit 61. In this embodiment, a motor, an inverter, a battery and a gear box are the devices requiring temperature control. A temperature sensor is provided for each of them. A vehicle speed and the degree of accelerator opening, which are vehicle operation information 64, are inputted to the air conditioning control unit 61 from a vehicle speed sensor and an accelerator sensor respectively. Further, road information and destination information, as vehicle running plan information 65, are inputted from a navigation system.

Figure 2:
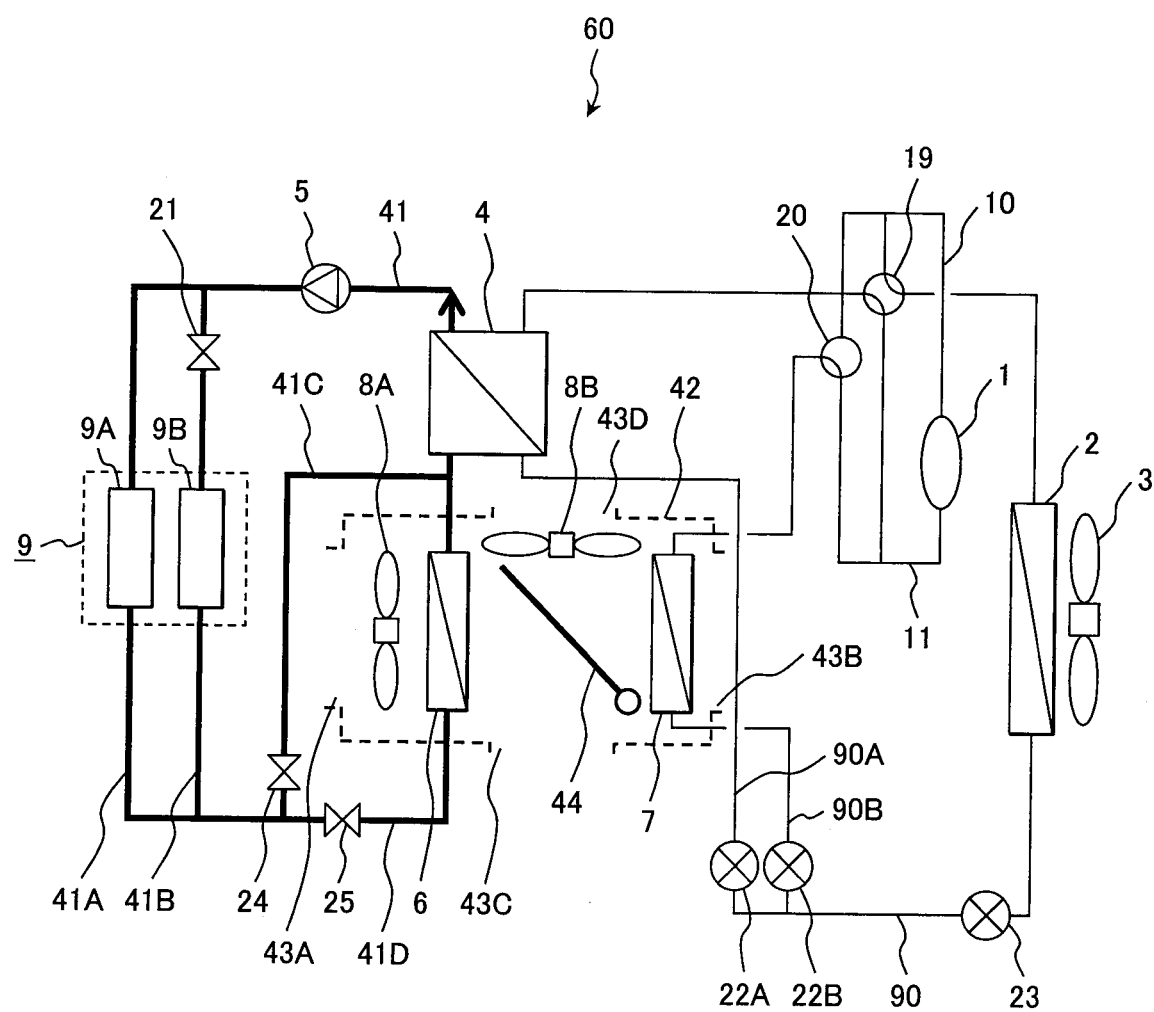
FIG. 2 is a diagram showing the construction of an air conditioning apparatus according to the present invention.

FIG. 2 is a diagram showing a schematic construction of the air conditioning apparatus 60. The air conditioning apparatus 60 includes a refrigerating cycle circuit 90 through which a cooling medium for air conditioning (e.g. refrigerant) circulates to effect inside air conditioning and cooling of heating units 9 and a device cooling circuit 41 through which a device cooling medium (e.g., cooling water) circulates to cool the heating units 9.

In the refrigerating cycle circuit 90, a compressor 1 for compressing a refrigerant, an outside heat exchanger 2 for heat exchange between a cooling medium for air conditioning and the outside air, an intermediate heat exchanger 4 disposed in a branched refrigerating cycle circuit 90A to effect heat exchange between the cooling medium for air conditioning and a device cooling medium flowing in the device cooling circuit 41, and an inside air conditioning heat exchanger 7 disposed in a refrigerating cycle circuit 90B to effect heat exchange between the cooling medium for air conditioning and the air present within the vehicle room, are connected together through a liquid piping which is for circulation of the cooling medium for air conditioning.

A four-way valve 19 is disposed between a suction pipe 11 and a discharge pipe 10 in the compressor 1. By switching the four-way valve 19 it is possible to connect one of the suction pipe 11 and the discharge pip 10 to the outside heat exchanger 2 and connect the other to intermediate heat exchanger 4 and inside air conditioning heat exchanger 7. The four-way valve 19 shown in FIG. 2 connects the discharge pipe 10 to the outside heat exchanger 2 and connects the suction pipe 11 to the intermediate heat exchanger 4.

One end of the inside air conditioning heat exchanger 7 is connected to the outside heat exchanger 2 and an opposite end thereof is connected switchably to either the discharge pipe 10 or the suction pipe 11 in the compressor 1 through a three-way valve 20.

Expansion valves 23, 22A, and 22B as flow rate control means of cooling medium for air conditioning, are disposed respectively on the side not connected to the compressor 1 in the outside heat exchanger 2, in the refrigerating cycle circuit 90A and between the intermediate heat exchanger 4 and the outside heat exchanger 2, and in the refrigerating cycle circuit 90B and between the inside air conditioning heat exchanger 7 and the outside heat exchanger 2. In the outside heat exchanger 2 is provided an outside fan 3 for supply of the outside air.

In the device cooling circuit 41, an inside cooling heat exchanger 6 for heat exchange between the device cooling medium and the inside room air, the intermediate heat exchanger 4, a circulating pump 5 for circulating the device cooling medium through the interior of the device cooling circuit 4, and the heating units 9 which require air conditioning, are connected annularly in order. The heating unit 9 comprises a heating unit 9A and 9B.

In the device cooling circuit 41 is provided a bypass circuit 41C which bypasses both ends of the inside cooling heat exchanger 6. A two-way valve 24 is provided in the bypass circuit 41C and a two-way valve 25 is provided in a main circuit 41D which passes through the inside cooling heat exchanger 6. By opening and closing operations of the two-way valves 24 and 25 it becomes possible to switch the flow path of the device cooling medium.

In the device cooling circuit 41, plural heating units 9A, 9B are connected in parallel as in FIG. 2 so as to be temperature-controlled. A two-way valve 21 is installed in a device cooling circuit 41B provided with the heating unit 9B, while a two-way valve is not installed in a device cooling circuit 41A provided with the heating unit 9A. When the two-way valve 21 is opened, both heating units 9A and 9B can be temperature-controlled, but when the two-way valve 21 is closed, only the heating unit 9A can be temperature-controlled. A two-way valve may be provided in the device cooling circuit 41A provided with the heating unit 9A, and the plural heating units 9A, 9B may be connected in series. How to connect the heating units 9 and how to install the two-way valve may be changed according to temperature conditions of the heating units.

An in-vehicle unit 42 which blows off temperature-controlled air for air conditioning of the vehicle room includes inside fans 8A and 8B for sucking in air from the interior of the room (the interior of the vehicle) or from the exterior of the room (the exterior of the vehicle) and blowing off the air to the exterior or the interior of the room, the inside cooling heat exchanger 6, the inside air conditioning heat exchanger 7, a switching damper 44 which makes switching so as to blow off air having been heat-exchanged in the inside cooling heat exchanger 6 to the interior or the exterior of the room, and air inlet/outlet ports 43A, 43B, 43C, 43D as ports for sucking in air from the interior or the exterior of the room and blowing off air to the interior or the exterior of the room.

The following description is now provided about the operation of the air conditioning apparatus 60 shown in FIG. 2. In this embodiment, the device cooling medium is circulated by the circulating pump 5 to control the temperatures of the heating units 9. Operations of the other devices vary depending on the air conditioning load and the amount of heat generated from each heating unit 9.

A description will be given below about nine type of operations such as device cooling, room cooling, room cooling and device cooling, room heating, room heating and device cooling, dehumidifying, room heating and dehumidifying, device heating, and defrosting operations.

[1. Device Cooling Operation]

The device cooling operation is an operation for cooling the heating units 9 in a state free of inside air conditioning and will be described with reference to FIG. 3. This operation includes a case where the device cooling medium circulating through the device cooling circuit 41 is cooled by only the inside cooling heat exchanger 6 and a case where it is cooled by both the inside cooling heat exchanger 6 and the intermediate heat exchanger 4.

By closing the two-way valve 24 and opening the two-way valve 25 in the device cooling circuit 41, the device cooling medium circulates through the inside cooling heat exchanger 6 and the intermediate heat exchanger 4 under operation of the circulating pump 5. When the two-way valve 21 is closed, the device cooling medium flows through only the device cooling circuit 41A, while when the two-way valve 21 is opened, the device cooling medium flows through both device cooling circuits 41A and 41B. For cooling both heating units 9A and 9B, the two-way valve 21 is opened.

Figure 3:
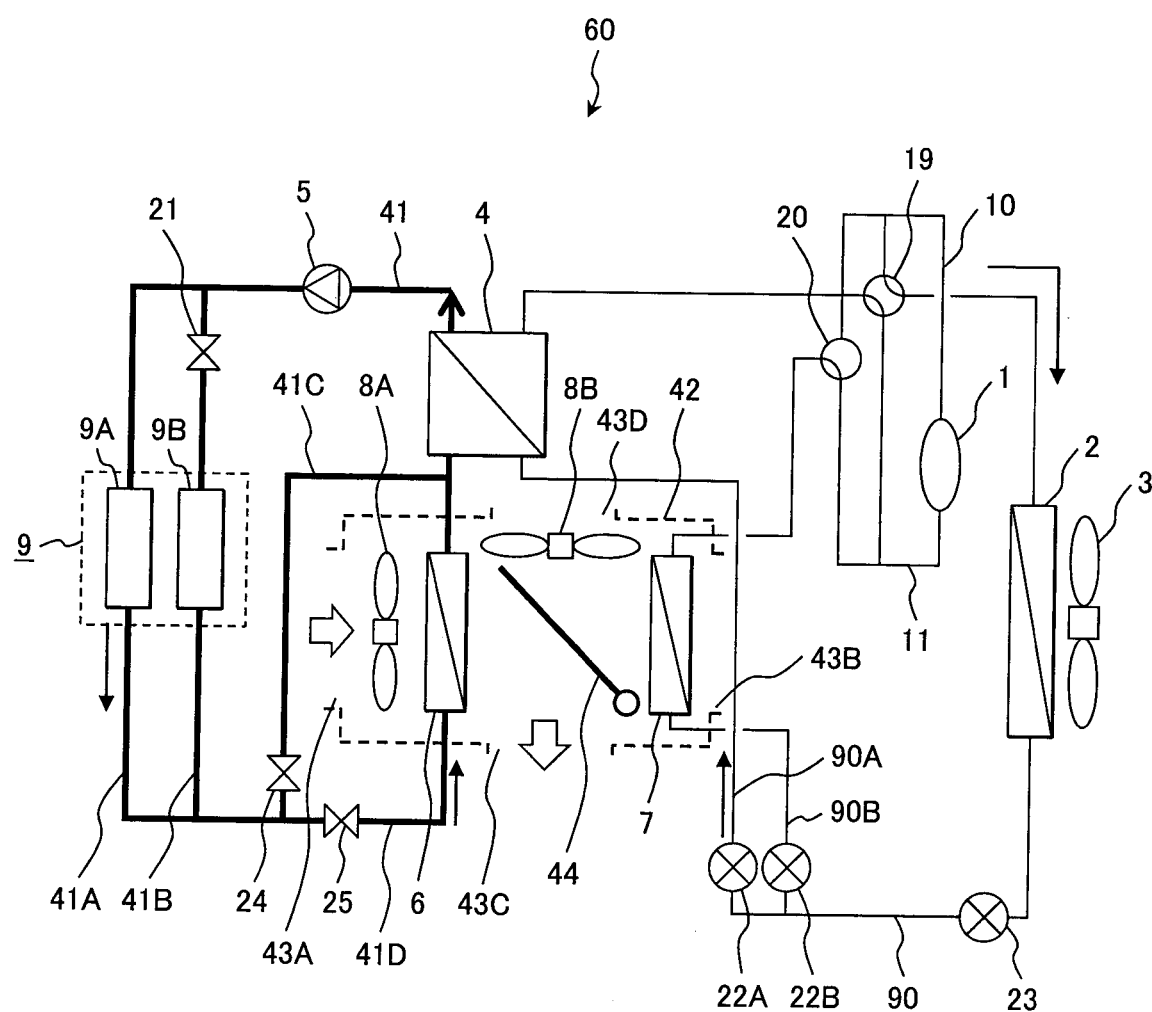
FIG. 3 is a diagram illustrating a device cooling operation.

The switching damper 44 which lies within the in-vehicle unit 42 is set so that the air sucked in from the air inlet/outlet port 43A passes through the inside cooling heat exchanger 6 and is blown off from the air inlet/outlet port 43C, as shown in FIG. 3. With the air passing through the inside cooling heat exchanger 6, the device cooling medium can be cooled. At this time, the inside fan 8B does not operate and hence does not suck in air from the air inlet/outlet port 43D.

Cooling capacity can be adjusted by adjusting the volume of air sucked in with the inside fan 8A. The air inlet/outlet port 43C communicates with the exterior of the room (the exterior of the vehicle) through a duct (not shown) to prevent warm air from being blown off into the vehicle room.

In case of cooling the device cooling medium by the intermediate heat exchanger 4, as shown in FIG. 3, the four-way valve 19 and the three-way valve 20 are connected, the discharge pipe 10 of the compressor 1 is connected to the outside heat exchanger 2, and the suction pipe 11 of the compressor 1 is connected to both intermediate heat exchanger 4 and inside air conditioning heat exchanger 7. The expansion valve 22B is fully closed to prevent the cooling medium for air conditioning from flowing through the inside air conditioning heat exchanger 7. That is, the outside heat exchanger 2 is used as a condenser and the intermediate heat exchanger 4 is used as an evaporator.

The cooling medium for air conditioning compressed by the compressor is liquefied by heat dissipation in the outside heat exchanger 2, then passes through the expansion valve 23 which is fully open, and flows through the intermediate heat exchanger 4. The cooling medium for air conditioning flowing to the intermediate heat exchanger 4 is reduced in pressure in the expansion valve 22A, becoming low in both temperature and pressure, then in the intermediate heat exchanger 4 it absorbs heat from the device cooling medium in the device cooling circuit 41 and evaporates thereby, then passes through the four-way valve 19 and returns to the compressor 1.

Thus, with use of the refrigerating cycle circuit 90, the device cooling medium and the cooling medium for air conditioning are heat-exchanged with each other in the intermediate heat exchanger 4, whereby the device cooling medium is cooled.

Thus, the device cooling medium can be cooled by both inside cooling heat exchanger 6 and intermediate heat exchanger 4. In the case where the temperature of the device cooling medium is lower than a predetermined temperature, the device cooling medium is cooled with only the inside cooling heat exchanger 6 without using the refrigerating cycle circuit 90, while when the temperature of the device cooling medium is higher than the predetermined temperature, the device cooling medium is cooled in both inside cooling heat exchanger 6 and intermediate heat exchanger 4 by using the refrigerating cycle circuit 90.

The temperature of the device cooling medium can be controlled by the air volume in the inside fan 8A, the flow rate of the circulating pump 5, the speed of revolutions of the compressor 1, the degree of opening of the expansion valve 22A and the air volume in the outside fan 3. When the temperature of the device cooling medium is higher than a target temperature, the air volume in the inside fan 8A, the flow rate in the circulating pump 5, the speed of revolutions of the compressor 1, the degree of opening of the expansion valve 22A, and the air volume in the outside fan 3, are all increased.

On the other hand, when the temperature of the device cooling medium is lower than the target temperature, the air volume in the inside fan 8A, the flow rate in the circulating pump 5, the speed of revolutions of the compressor 1, the degree of opening of the expansion valve 22A, and the air volume in the outside fan 3, are all decreased. It is not necessary to control all of the actuators, but it suffices to control at least one actuator.

[2. Room Cooling Operation]

The room cooling operation is an operation for cooling the interior of the vehicle room without cooling the heating units 9 and will be described below with reference to FIG. 4.

In the device cooling circuit 41, by closing the two-way valve 25 and opening the two-way valve 24, the device cooling medium flows through the device cooling circuit 41C without flowing through the inside cooling heat exchanger 6 under operation of the circulating pump 5. The reason why the device cooling medium in the device cooling circuit 41 is circulated even in case of the heating units 9 being not cooled is that it is intended to prevent a localized temperature rise of the device cooling medium present in the portion of the heating units 9. When the two-way valve 21 is closed, the device cooling medium flows through only the device cooling circuit 41A, while when the two-way valve 21 is opened, the device cooling medium flows through both device cooling circuits 41A and 41B.

Figure 4:
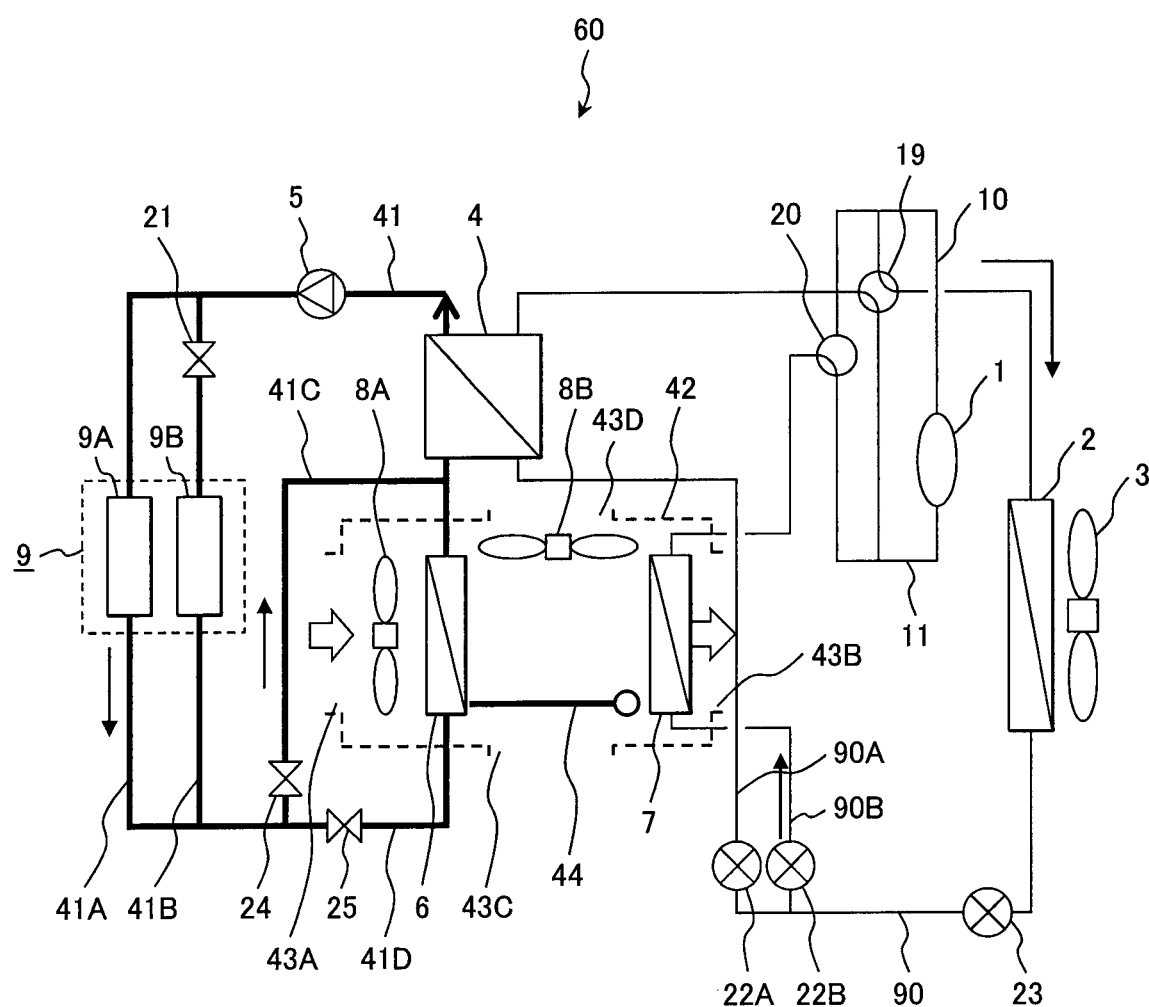
FIG. 4 is a diagram illustrating a room cooling operation.

The switching damper 44 which lies within the in-vehicle unit 42 is set so that the air sucked in from the air inlet/outlet port 43A passes through both inside cooling heat exchanger 6 and inside air conditioning heat exchanger 7 and is blown off from the air inlet/outlet port 43B, as shown in FIG. 4. At this time, the inside fan 8B does not operate and hence air is not sucked in from the air inlet/outlet port 43D. Since the device cooling medium is not circulating through the inside cooling heat exchanger 6, the temperature of the air passing through the inside cooling heat exchanger 6 does not change. The air inlet/outlet port 43B communicates with the interior of the room (the interior of the vehicle) through a duct (not shown) to control the temperature in the interior of the room.

In the room cooling operation, as shown in FIG. 4, the four-way valve 19 and the three-way valve 20 are connected, the discharge pipe 10 of the compressor 1 is connected to the outside heat exchanger 2, and the suction pipe 11 of the compressor 1 is connected to both intermediate heat exchanger 4 and inside air conditioning heat exchanger 7. The expansion valve 22A is fully closed to prevent the cooling medium for air conditioning from flowing in the intermediate heat exchanger 4. That is, the outside heat exchanger 2 is used as a condenser and the inside air conditioning heat exchanger 7 is used as an evaporator.

The cooling medium for air conditioning compressed by the compressor 1 is liquefied by heat dissipation in the outside heat exchanger 2, then passes through the expansion valve 23 which is fully open, and flows through the inside air conditioning heat exchanger 7. The cooling medium for air conditioning flowing in the inside air conditioning heat exchanger 7 is pressure-reduced and becomes low in both temperature and pressure, then evaporates by absorbing heat from the air sucked from the air inlet/outlet port 43A in the inside air conditioning heat exchanger 7 and returns to the compressor 1 through the three-way valve 20. Thus, the air which was cooled by heat exchange in the inside air conditioning heat exchanger 7 is blown off to the interior of the vehicle room from the air inlet/outlet port 43B.

The temperature of the air blown off from the air inlet/outlet port 43B can be controlled by the air volume in the inside fan 8A, the speed of revolutions of the compressor 1, the degree of opening of the expansion valve 22B and the air volume in the outside fan 3. When the blown-off air temperature is higher than a target temperature, the air volume in the inside fan 8A, the speed of revolutions of the compressor 1, the degree of opening of the expansion valve 22B and the air volume in the outside fan 3 are all increased. On the other hand, when the blown-off air temperature is lower than the target temperature, the air volume in the inside fan 8A, the speed of revolutions of the compressor 1, the degree of opening of the expansion valve 22B and the air volume in the outside fan 3 are all decreased. It is not necessary to control all of the actuators, but it suffices to control at least one actuator.

[3. Room Cooling and Device Cooling Operation]

The room cooling and device cooling operation is an operation for cooling the heating units 9 and the interior of the vehicle room. This operation involves a case where the device cooling medium circulating through the device cooling circuit 41 is cooled by only the inside cooling heat exchanger 6 and a case where it is cooled by both inside cooling heat exchanger 6 and intermediate heat exchanger 4.

In the device cooling circuit 41, by closing the two-way valve 24 and opening the two-way valve 25, the device cooling medium circulates through both inside cooling heat exchanger 6 and intermediate heat exchanger 4 under operation of the circulating pump 5. When the two-way valve 21 is closed, the device cooling medium flows through only the device cooling circuit 41A, while when the two-way valve 21 is opened, the device cooling medium flows through both device cooling circuits 41A and 41B. For cooling both heating units 9A and 9B, the two-way valve 21 is opened.

Figure 5:
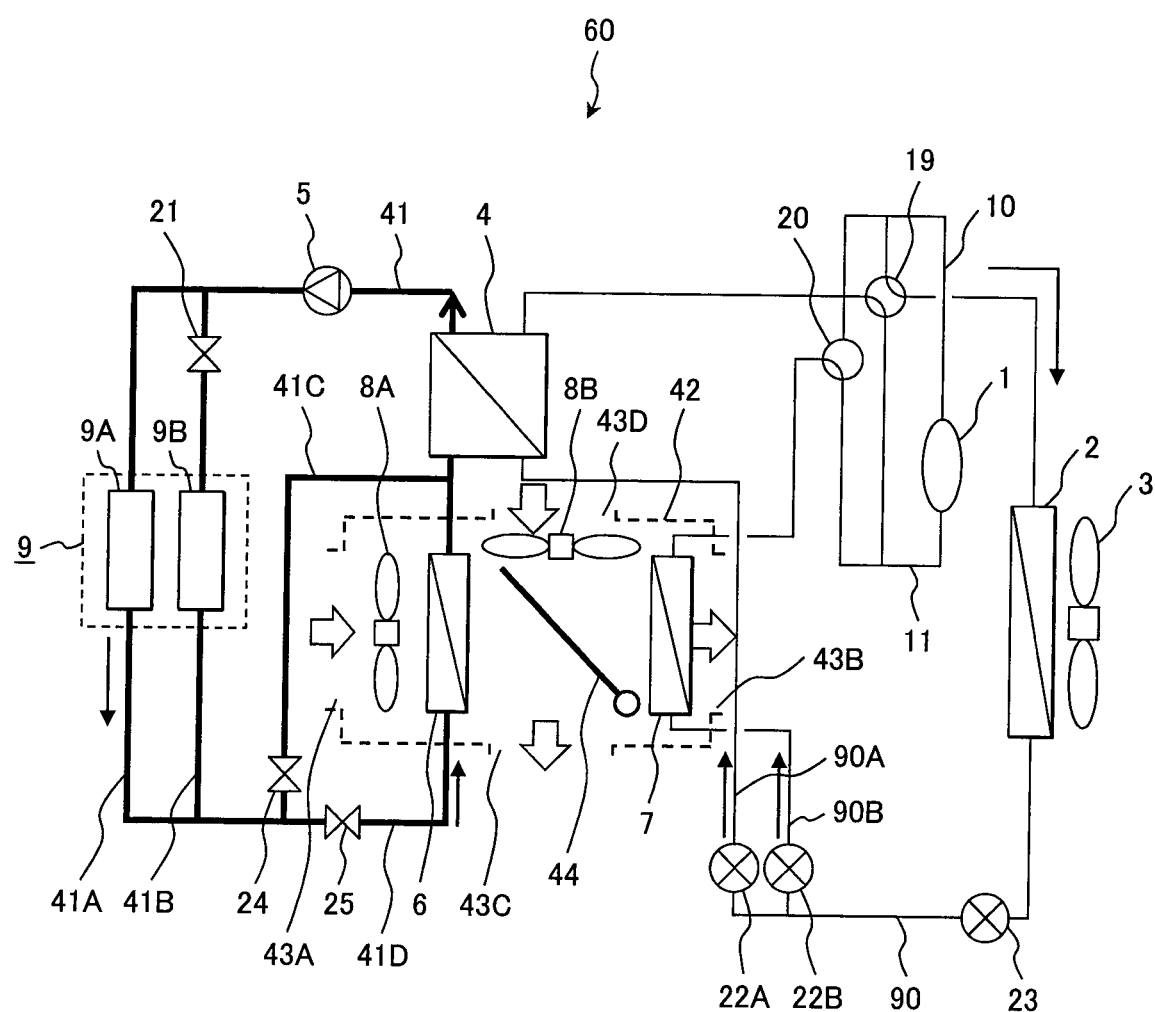
FIG. 5 is a diagram illustrating a room cooling and device cooling operation.

The switching damper 44 which lies within the in-vehicle unit 42 is set so that the air sucked in from the air inlet/outlet port 43A passes through the inside cooling heat exchanger 6 and is blown off from the air inlet/outlet port 43C, as shown in FIG. 5. The air inlet/outlet port 43C communicates with the exterior of the room (the exterior of the vehicle) through a duct (not shown) to prevent air from being blown off into the room. The switching damper 44 is also set so that the air sucked in from the air inlet/outlet port 43D by the inside fan 8B passes through the inside air conditioning heat exchanger 7 and is blown off from the air inlet/outlet port 43B. With the air passing through the inside cooling heat exchanger 6, it is possible to cool the device cooling medium. The air sucked in from the air inlet/outlet port 43D and passing through the inside air conditioning heat exchanger 7 is cooled by the inside air conditioning heat exchanger 7 and the thus-cooled air is blown off to the interior of the room (the interior of the vehicle).

In the room cooling and device cooling operation, as shown in FIG. 5, the four-way valve 19 and the three-way valve 20 are connected, the discharge pipe 10 of the compressor 1 is connected to the outside heat exchanger 2, and the suction pipe 11 of the compressor 1 is connected to both intermediate heat exchange 4 and inside air conditioning heat exchanger 7. That is, the outside heat exchanger 2 is used as a condenser and both intermediate heat exchanger 4 and inside air conditioning heat exchanger 7 are used as evaporators.

The cooling medium for air conditioning compressed by the compressor 1 is liquefied by heat dissipation in the outside heat exchanger 2, then passes through the expansion valve 23 which is fully open, and flows through the intermediate heat exchanger 4 and the inside air conditioning heat exchanger 7. The cooling medium for air conditioning flowing in the intermediate heat exchanger 4 is pressure-reduced in the expansion valve 22A and becomes low in both temperature and pressure, then in the intermediate heat exchanger 4 the cooling medium for air conditioning evaporates by absorbing heat from the device cooling medium in the device cooling circuit 41 and returns to the compressor 1 through the four-way valve 19. Thus, the device cooling medium and the cooling medium for air condition are heat-exchanged in the intermediate heat exchanger 4, whereby the device cooling medium is cooled.

The cooling medium for air conditioning flowing to the inside air conditioning heat exchanger 7 is pressure-reduced in the expansion valve 22B, becoming low in both temperature and pressure, then evaporates by absorbing heat from the air sucked in from the air inlet/outlet port 43D in the inside air conditioning heat exchanger 7 and returns to the compressor 1 through the three-way valve 20. Thus, the air cooled by heat exchange in the inside air conditioning heat exchanger 7 is blown off to the interior of the vehicle room from the air inlet/outlet port 43B.

As described above, since both intermediate heat exchanger 4 and the inside air conditioning heat exchanger 7 can be utilized as evaporators, it is possible to effect both cooling of the vehicle room interior and cooling of the heating units 9 at a time. Further, the intermediate heat exchanger 4 and the inside air conditioning heat exchanger 7 are connected in parallel with the suction pipe 11 of the compressor 1, and in the respective refrigerating cycle circuits 90A and 90B are provided expansion valves 22A and 22B, so that the flow rate of the cooling medium for air conditioning flowing to the intermediate heat exchanger 4 and that of the cooling medium for air conditioning flowing to the inside air conditioning heat exchanger 7 can be changed arbitrarily.

As a result, the temperature of the device cooling medium and that of the cooling medium for air conditioning can be controlled to any desired temperatures respectively. Therefore, even when the temperature of the cooling medium for air conditioning is sufficiently lowered to effect room cooling, the temperature of the device cooling medium flowing through the interior of each heating unit 9 can be maintained high by suppressing the flow rate of the refrigerant flowing to the intermediate heat exchanger 4.

The device cooling medium can be cooled by both inside cooling heat exchanger 6 and intermediate heat exchanger 4, as described above. When the temperature of the device cooling medium is lower than a predetermined temperature, the device cooling medium is cooled by only the inside cooling heat exchanger 6 without using the refrigerating cycle circuit 90, while when the temperature of the device cooling medium is higher than the predetermined temperature, the device cooling medium is cooled by both inside cooling heat exchanger 6 and intermediate heat exchanger 4 and with use of the refrigerating cycle circuit 90. This is controlled by the degree of opening of the expansion valve 22A.

With the expansion valve 22A fully closed, the cooling medium for air conditioning no longer flows in the intermediate heat exchanger 4 and therefore the device cooling medium is cooled by only the inside cooling heat exchanger 6.

The temperature of the device cooling medium and that of the air blown off from the air inlet/outlet port 43B can be controlled by the air volumes in the inside fans 8A, 8B, the flow rate in the circulating pump 5, the speed of revolutions of the compressor 1, the degrees of opening of the expansion valves 22A, 22B and the air volume in the outside fan 3.

When the temperature of the device cooling medium is higher than a target temperature or when the temperature of the blown-off air is higher than a target temperature, the air volumes in the inside fans 8A, 8B, the flow rate in the circulating pump 5, the speed of revolutions of the compressor 1, the degrees of opening of the expansion valves 22A, 22B and the air volume in the outside fan 3 are all increased.

On the other hand, when the temperature of the device cooling medium is lower than the target temperature or when the temperature of the blown-off air is lower than the target temperature, the air volumes in the inside fans 8A, 8B, the flow rate in the circulating pump 5, the speed of revolutions of the compressor 1, the degrees of opening of the expansion valves 22A, 22B and the air volume in the outside fan 3 are all decreased. It is not necessary to control all of the actuators, but it suffices to control at least one actuator.

[4. Room Heating Operation]

The room heating operation is an operation for heating the interior of the vehicle room without cooling the heating units 9 and will be described below with reference to FIG. 6.

In the device cooling circuit 41, by opening the two-way valve 25 and closing the two-way valve 24, the device cooling medium comes to flow in both inside cooling heat exchanger 6 and intermediate heat exchanger 4 under operation of the circulating pump 5. When the two-way valve 21 is closed, the device cooling medium flows through only the device cooling circuit 41A, while when the two-way valve 21 is opened, the device cooling medium flows through both device cooling circuits 41A and 41B.

Figure 6:
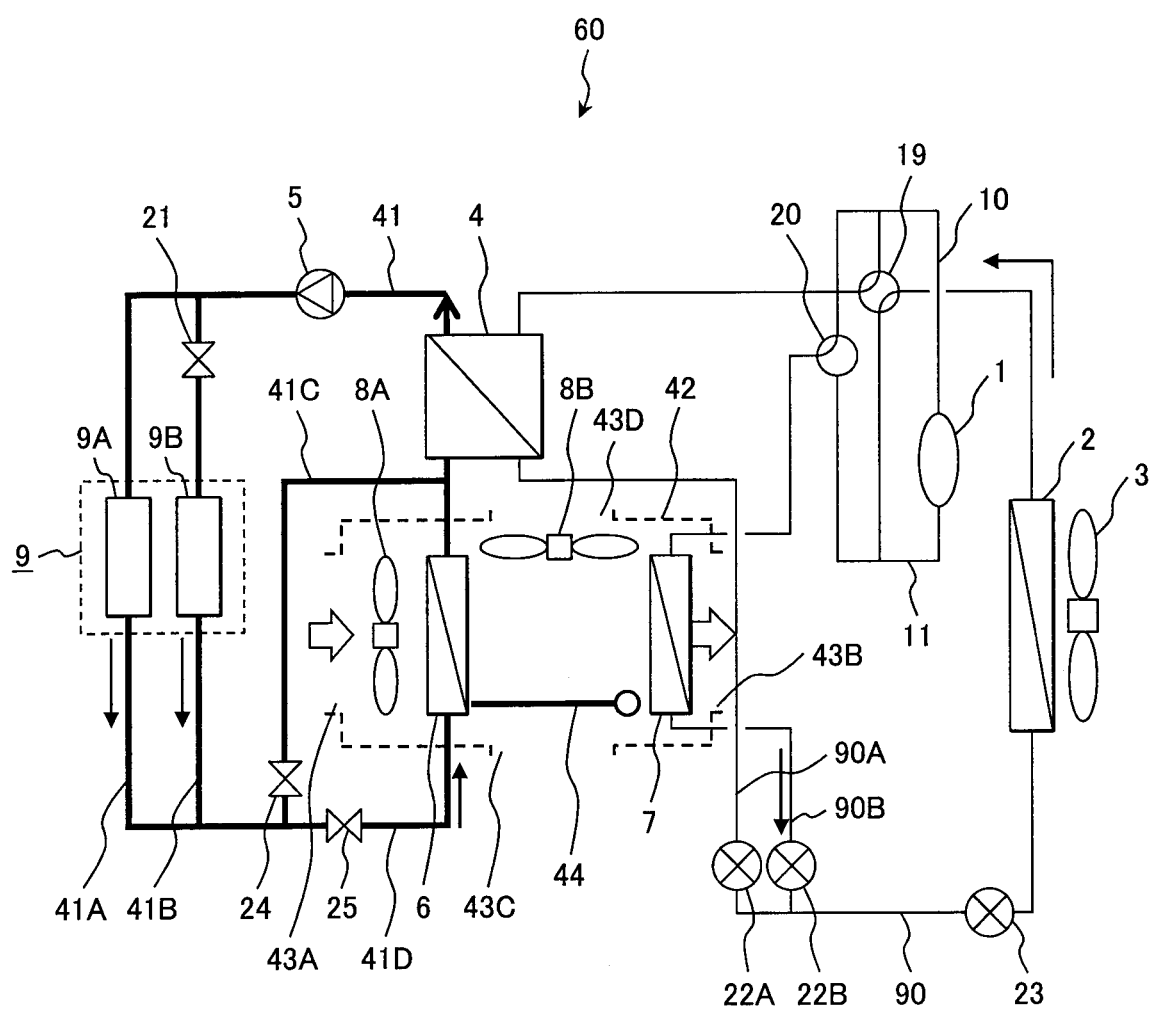
FIG. 6 is a diagram illustrating a room heating operation.

The switching damper 44 which lies within the in-vehicle unit 42 is set so that the air sucked in from the air inlet/outlet port 43A passes through both inside cooling heat exchanger 6 and inside air conditioning heat exchanger 7 and blows off from the air inlet/outlet port 43B, as shown in FIG. 6. At this time, the inside fan 8B does not operate and therefore does not suck in air from the air inlet/outlet port 43D. Since the device cooling medium which has been warmed by the heating units 9 circulates through the inside cooling heat exchanger 6, the temperature of the air passing through the heat exchanger 6 is raised. The air inlet/outlet port 43B is in communication with the interior of the room (the interior of the vehicle) to control the temperature of the room interior.

When the room heating load is small, the waste heat generated from the heating units 9 is utilized for room heating as described above and the refrigerating cycle circuit 90 is not utilized for room heating. By so doing, it is possible to effect air conditioning with suppressed energy consumption.

When the two-way valve 21 is open, the device cooling medium flows also to the device cooling circuit 41B and the waste heat from the heating unit 9B can be utilized for room heating, thus making it possible to further suppress the consumption of energy.

If with the waste heat from the heating units 9A and 9B alone the room heating load is not satisfied, the refrigerating cycle circuit 90 is also used in addition to the waste heat from the heating units 9A and 9B. In this case, as shown in FIG. 6, the four-way valve 19 and the three-way valve 20 are connected, the discharge pipe 10 of the compressor 1 is connected to both intermediate heat exchanger 4 and inside air conditioning heat exchanger 7, and the suction pipe 11 of the compressor 1 is connected to the outside heat exchanger 2.

The expansion valve 22A is fully closed and the expansion valve 22B is fully opened so that the cooling medium for air conditioning flows in only the inside air conditioning heat exchanger 7 without flowing through the intermediate heat exchanger 4. That is, the inside air conditioning heat exchanger 7 is used as a condenser and the outside heat exchanger 2 is used as an evaporator.

The cooling medium for air conditioning compressed by the compressor 1 is condensed into liquid by heat dissipation in the inside air conditioning heat exchanger 7. Thereafter, the cooling medium for air conditioning is pressure-reduced by the expansion valve 23 and is then evaporated into gas by heat exchange with the outside air in the outside heat exchanger 2, which gas returns to the compressor 1.

Thus, the air sucked in from the air inlet/outlet port 43A is heated in the inside cooling heat exchanger 6 with the device cooling medium flowing through the device cooling circuit 41. The air is further warmed by heat exchange in the inside air conditioning heat exchanger 7 disposed on the downstream side and the thus-warmed air is blown off to the interior of the vehicle room from the air inlet/outlet port 43B.

Thus, according to the construction in question, the air to be blown off to the interior of the vehicle room is once warmed with waste heat generated from the heating units 9 and then is further warmed in the refrigerating cycle circuit 90. Since the heating of the air with use of the refrigerating cycle circuit 90 makes up a deficiency in case the temperature of the air warmed with the waste heat from the heating units 9 is deficient, the air conditioning apparatus can be constructed as an apparatus of reduced energy consumption.

The temperature of the air blown off from the air inlet/outlet port 43B can be controlled by the air volume in the inside fan 8A, the flow rate in the circulating pump 5, the speed of revolutions of the compressor 1, the degree of opening of the expansion valve 22B and the air volume in the outside fan 3.

When the temperature of the blown-off air is lower than a target temperature, the air volume in the inside fan 8A, the flow rate in the circulating pump 5, the speed of revolutions of the compressor 1, the degree of opening of the expansion valve 22B and the air volume in the outside fan 3 are all increased.

On the other hand, when the temperature of the blown-off air is higher than the target temperature, the air volume in the inside fan 8A, the flow rate in the circulating pump 5, the speed of revolutions of the compressor 1, the degree of opening of the expansion valve 22B and the air volume in the outside fan 3 are all decreased. It is not necessary to control all of the actuators, but it suffices to control at least one actuator.

[5. Room Heating and Device Cooling Operation]

The room heating and device cooling operation is an operation for cooling the heating units 9 and heating the interior of the vehicle room and will be described with reference to FIG. 7. As described in the above room heating operation, if the temperature of the device cooling medium can be kept not higher than the target temperature by heat dissipation in the inside cooling heat exchanger 6, it is possible to prevent a rise in temperature of the heating units 9, but if there remains insufficiency under the heat dissipation in the inside cooling heat exchanger 6 or in case of lowering the temperature of the device cooling medium temporarily as will be described later, it becomes necessary to perform device cooling with use of the refrigerating cycle circuit 90.

Figure 7:
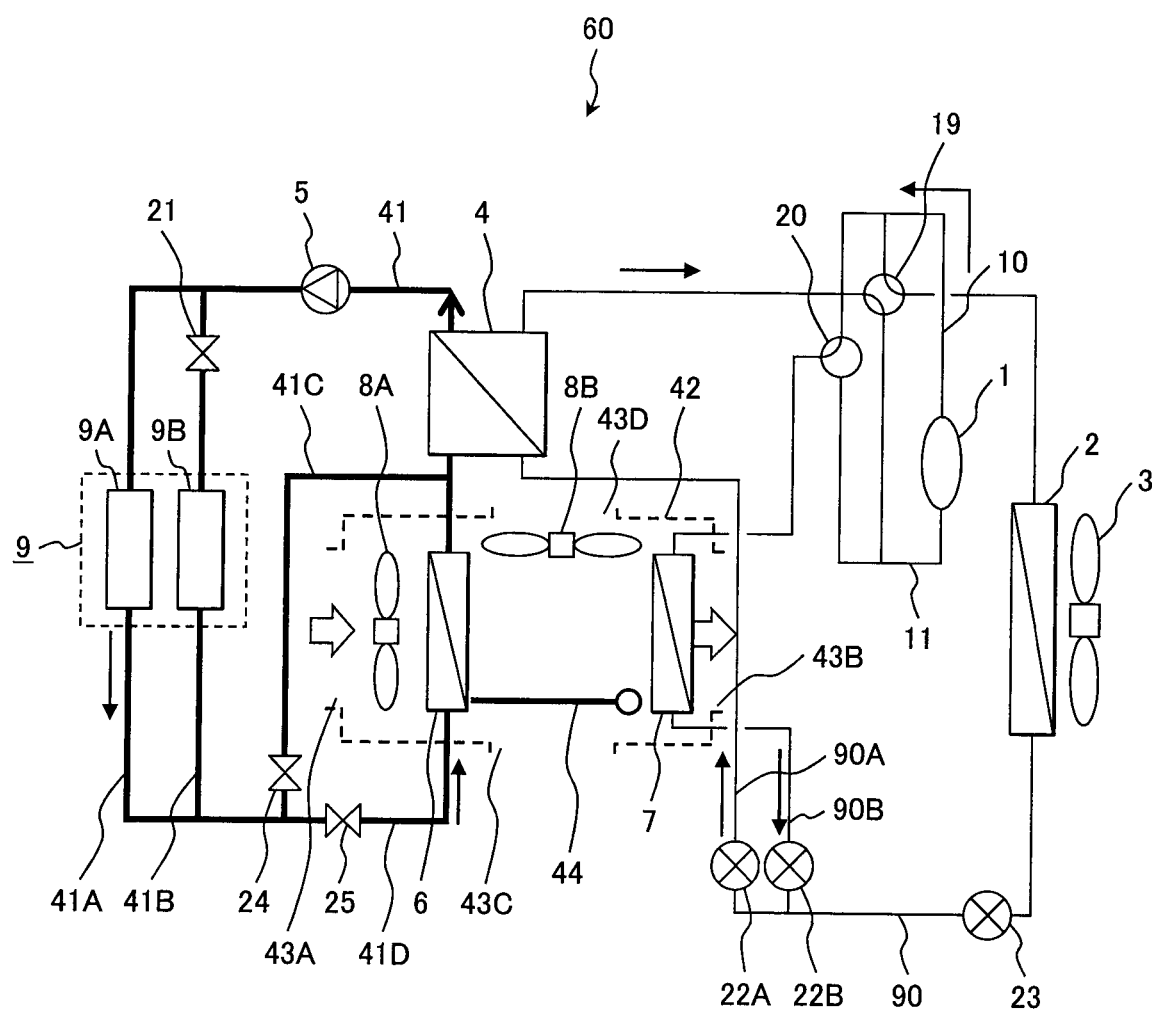
FIG. 7 is a diagram illustrating a room heating and device cooling operation.

In the room heating and device cooling operation, as shown in FIG. 7, the four-way valve 19 and the three-way valve 20 are connected, the discharge pipe 10 of the compressor 1 is connected to both outside heat exchanger 2 and inside air conditioning heat exchanger 7, and the suction pipe 11 of the compressor 1 is connected to the intermediate heat exchanger 4. The expansion valve 23 is fully closed and the expansion valve 22B is fully opened to prevent the cooling medium for air conditioning from flowing to the outside heat exchanger 2. That is, the inside air conditioning heat exchanger 7 is used as a condenser and the intermediate heat exchanger 4 is used as an evaporator.

The cooling medium for air conditioning compressed by the compressor 1 is condensed into liquid by heat dissipation in the inside air conditioning heat exchanger 7, then is pressure-reduced in the expansion valve 22A, then in the intermediate heat exchanger 4 it is evaporated into gas by heat exchange with the device cooling medium flowing through the device cooling circuit 41, which gas returns to the compressor 1. In the intermediate heat exchange 4, the device cooling medium and the cooling medium for air conditioning are heat-exchanged with each other, whereby the device cooling medium is cooled.

In the device cooling circuit 41, by opening the two-way valve 25 and closing the two-way valve 24, the device cooling medium flows through both inside cooling heat exchanger 6 and intermediate heat exchanger 4 under operation of the circulating pump 5. When the two-way valve 21 is closed, the device cooling medium flows through only the device cooling circuit 41A, while when the two-way valve 21 is opened, the device cooling medium flows through both device cooling circuits 41A and 41B.

The switching damper 44 which lies within the in-vehicle unit 42 is set so that the air sucked in from the air inlet/outlet port 43A passes through both inside cooling heat exchanger 6 and inside air conditioning heat exchanger 7 and blows off from the air inlet/outlet port 43B, as shown in FIG. 7. At this time, the inside fan 8B does not operate and hence does not suck in air from the air inlet/outlet port 43D. Since the device cooling medium warmed by the heating units 9 is circulating through the inside cooling heat exchanger 6, the temperature of the air passing through the inside cooling heat exchanger 6 is raised. The air is further warmed by heat exchange in the inside air conditioning heat exchanger 7 disposed on the downstream side and the thus-warmed air is blown off to the interior of the vehicle room from the air inlet/outlet port 43B.

Thus, according to the construction in question, the air to be blown off to the interior of the vehicle room is once warmed with the waste heat generated from the heating units 9 and then is further warmed in the refrigerating cycle circuit 90. The air inlet/outlet port 43B communicates with the interior of the room (the interior of the vehicle) through a duct (not shown) to control the temperature of the interior of the room.

It becomes possible to cool the device cooling medium by heat dissipation in the inside cooling heat exchanger 6 and heat exchange in the intermediate heat exchanger 4. The temperature of the device cooling medium and that of the air blown off from the air inlet/outlet port 43B can be controlled by the air volume in the inside fan 8A, the flow rate in the circulating pump 5, the speed of revolutions of the compressor 1 and the degree of opening of the expansion valve 22A.

When the temperature of the device cooling medium is higher than a target temperature or when the temperature of the blown-off air is lower than a target temperature, the air volume in the inside fan 8A, the flow rate in the circulating pump 5, the speed of revolutions of the compressor 1 and the degree of opening of the expansion valve 22A are increased.

On the other hand, when the temperature of the device cooling medium is lower than the target temperature or when the temperature of the blown-off air is higher than the target temperature, the air volume in the inside fan 8A, the flow rate in the circulating pump 5, the speed of revolutions of the compressor 1 and the degree of opening of the expansion valve 22 are all decreased. It is not necessary to control all of the actuators, but it suffices to control at least one actuator.

[6. Dehumidifying Operation]

The dehumidifying operation is an operation for dehumidifying the interior of the vehicle room and will be described below with reference to FIG. 8.

Figure 8:
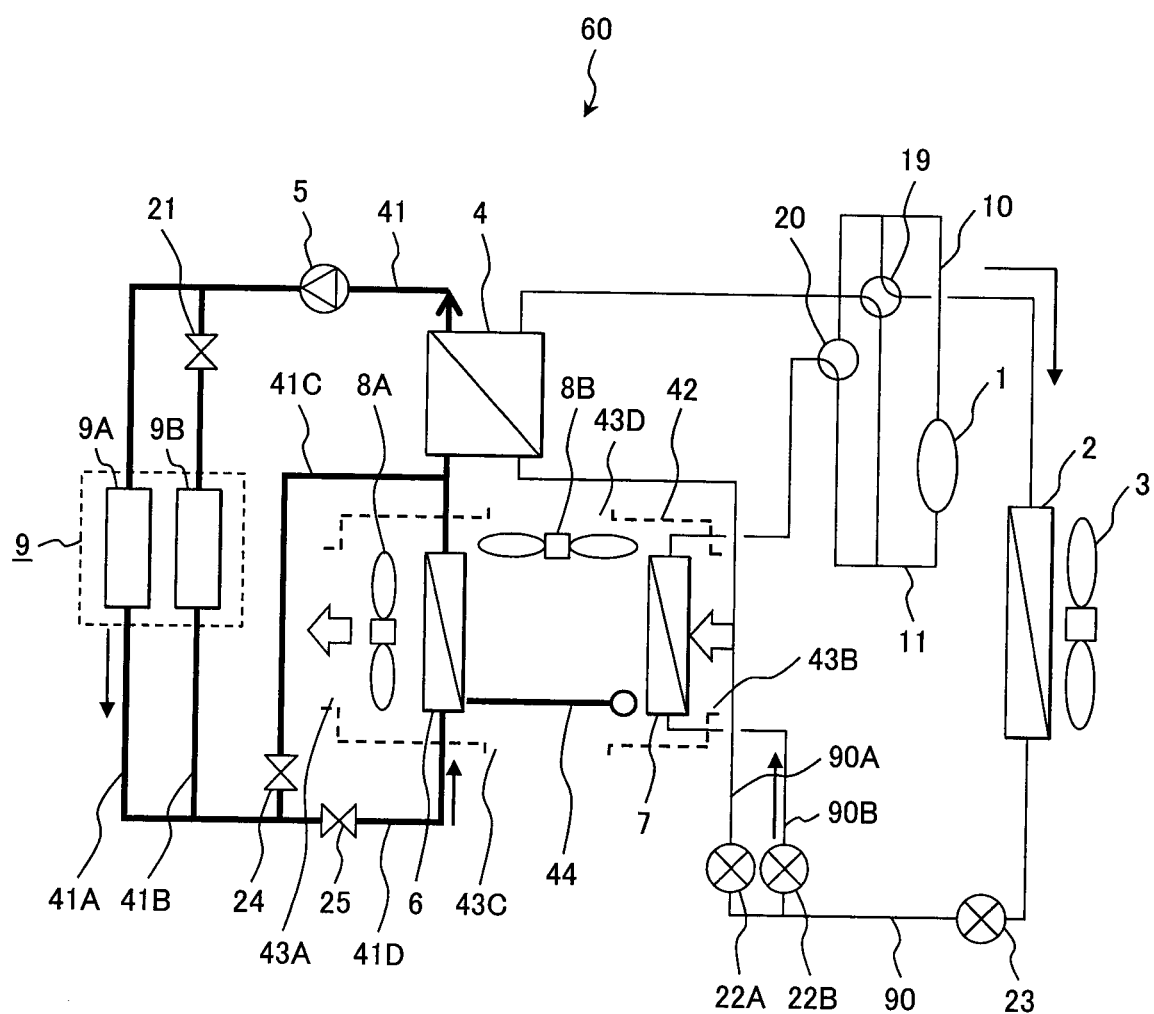
FIG. 8 is a diagram illustrating a dehumidifying operation.

In the dehumidifying operation, as shown in FIG. 8, the four-way valve 19 and the three-way valve 20 are connected, the discharge pipe 10 of the compressor 1 is connected to the outside heat exchanger 2, and the suction pipe 11 of the compressor 1 is connected to both intermediate heat exchanger 4 and inside air conditioning heat exchanger 7. The expansion valve 22A is fully closed and the expansion valve 23 is fully opened to prevent the cooling medium for air conditioning from flowing to the intermediate heat exchanger 4. That is, the outside heat exchanger 2 is used as a condenser and the inside air conditioning heat exchanger 7 is used as an evaporator.

The cooling medium for air conditioning compressed by the compressor 1 is liquefied by heat dissipation in the outside heat exchanger 2, then passes through the expansion valve 23 which is fully open, and flows through the inside air conditioning heat exchanger 7. The cooling medium for air conditioning flowing through the inside air conditioning heat exchanger 7 is pressure-reduced in the expansion valve 22B and becomes low in both temperature and pressure. Then, in the inside air conditioning heat exchanger 7, the cooling medium for air conditioning evaporates by absorbing heat from the air sucked in from the air inlet/outlet port 43B and returns to the compressor 1 through the three-way valve 20.

In the device cooling circuit 41, by opening the two-way valve 25 and closing the two-way valve 24, the device cooling mediums flows through both intermediate heat exchanger 4 and inside cooling heat exchanger 6 under operation of the circulating pump 5. When the two-way valve 21 is closed, the device cooling medium flows through only the device cooling circuit 41A, while when the two-way valve 21 is opened, the device cooling medium flows through both device cooling circuits 41A and 41B.

The switching damper 44 which lies within the in-vehicle unit 42 is set so that the air sucked in from the air inlet/outlet port 43B passes through both inside air conditioning heat exchanger 7 and inside cooling heat exchanger 6 and blows off from the air inlet/outlet port 43A, as shown in FIG. 8. At this time, the inside fan 8B does not operate and hence does not suck in air from the air inlet/outlet port 43D. The air sucked in from the air inlet/outlet port 43B is heat-exchanged in the inside air conditioning heat exchanger 7 and is dehumidified and cooled thereby. Since the device cooling medium warmed by the heat from the heating units 9 is circulating through the inside cooling heat exchanger 6, the temperature of the air passing through the inside cooling heat exchanger 6 is raised.

In this way it becomes possible to perform a so-called reheat dehumidifying operation. The air fed into the interior of the vehicle room becomes low in relative humidity, so that the comfortableness of the interior space can be improved. The air inlet/outlet port 43A communicates with the interior of the room (the interior of the vehicle) through a duct (not shown) to control the temperature of the interior of the room.

The heat source of the inside cooling heat exchanger 6, which is utilized as a reheater, is the waste heat generated from the heating units 9. Therefore, unlike the case of using a heater or the like for reheating, it is not necessary to newly supply energy and hence it becomes possible to improve the comfortableness of the interior of the vehicle room without increasing the power consumption.

The dehumidifying quantity can be controlled by the air volume in the inside fan 8A, the flow rate in the circulating pump 5, the speed of revolutions of the compressor 1, the degree of opening of the expansion valve 22B and the air volume in the outside fan 3.

The dehumidifying quantity can be increased by increasing all of the air volume in the inside fan 8A, the flow rate in the circulating pump 5, the speed of revolutions of the compressor 1, the degree of opening of the expansion valve 22B and the air volume in the outside fan 3.

On the other hand, the dehumidifying quantity can be decreased by decreasing all of the air volume in the inside fan 8A, the flow rate in the circulating pump 5, the speed of revolutions of the compressor 1, the degree of opening of the expansion valve 22B and the air volume in the outside fan 3. It is not necessary to control all of the actuators, but it suffices to control at least one actuator.

[7. Room Heating and Dehumidifying Operation]

The room heating and dehumidifying operation is an operation for heating and dehumidifying the interior of the vehicle room and will be described below with reference to FIG. 9.

Figure 9:
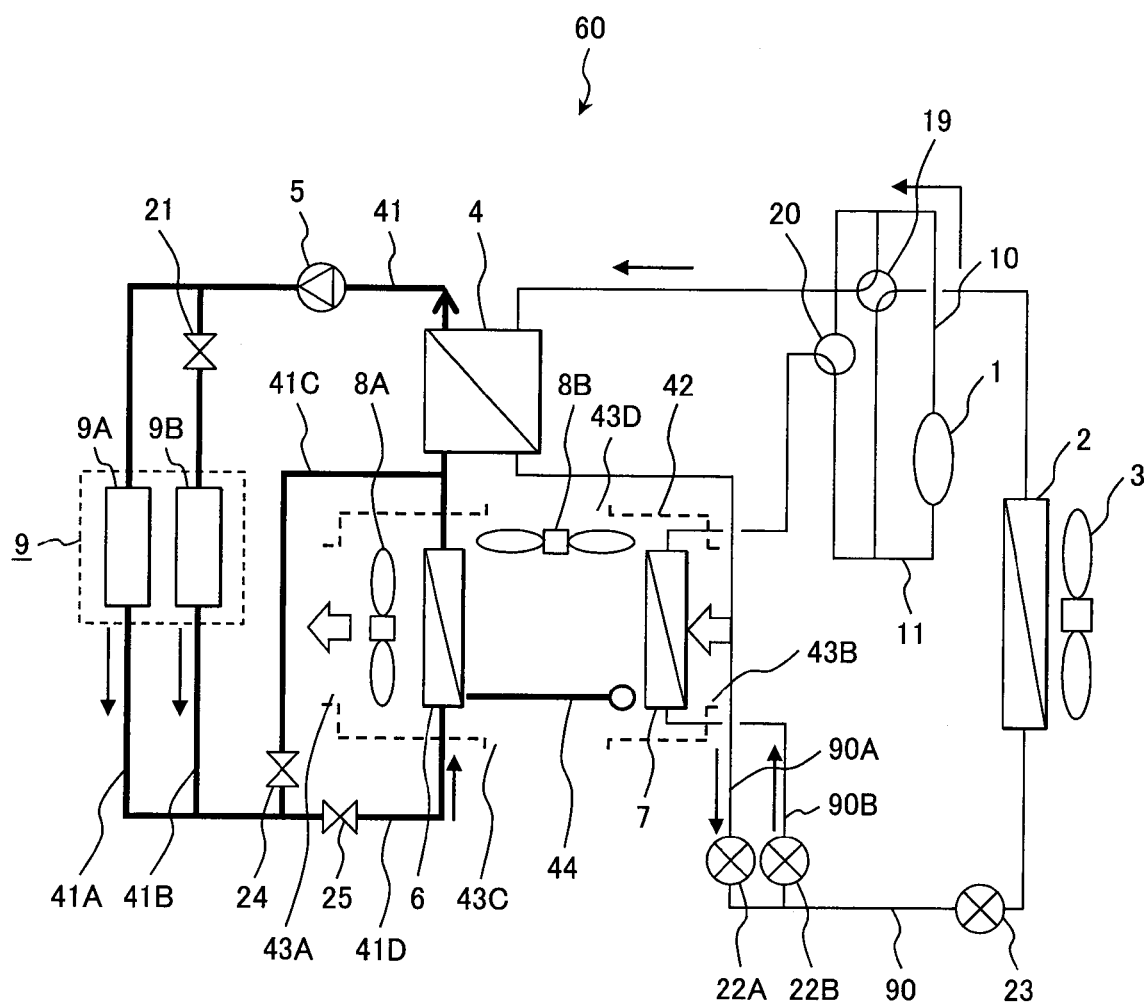
FIG. 9 is a diagram illustrating a room heating and dehumidifying operation.

In the room heating and dehumidifying operation, as shown in FIG. 9, the four-way valve 19 and the three-way valve 20 are connected, the discharge pipe 10 of the compressor 1 is connected to the intermediate heat exchanger 4, and the suction pipe 11 of the compressor 1 is connected to both outside heat exchanger 2 and inside air conditioning heat exchanger 7. The expansion valve 22A is fully opened and the expansion valve 23 is fully closed to prevent the cooling medium for air conditioning from flowing to the outside heat exchanger 2. That is, the intermediate heat exchanger 4 is used as a condenser and the inside air conditioning heat exchanger 7 is used as an evaporator.

The cooling medium for air conditioning compressed by the compressor 1 is liquefied by heat dissipation in the intermediate heat exchanger 4, then passes through the expansion valve 22A which is fully open, and flows through the inside air conditioning heat exchanger 7. The cooling medium for air conditioning flowing through the inside air conditioning heat exchanger 7 is pressure-reduced in the expansion valve 22B, becoming low in both temperature and pressure. Then, in the inside air conditioning heat exchanger 7, the cooling medium for air conditioning evaporates by absorbing heat from the air sucked from the air inlet/outlet port 43B and returns to the compressor 1 through the three-way valve 20. In the intermediate heat exchanger 4, the device cooling medium and the cooling medium for air conditioning are heat-exchanged with each other, whereby the device cooling medium is heated.

In the device cooling circuit 41, by opening the two-way valve 25 and closing the two-way valve 24, the device cooling medium flows through both intermediate heat exchanger 4 and inside cooling heat exchanger 6 under operation of the circulating pump 5. When the two-way valve 21 is closed, the device cooling medium flows through only the device cooling circuit 41A, while when the two-way valve 21 is opened, the device cooling medium flows through both device cooling circuits 41A and 41B. In case of utilizing much waste heat generated from the heating units 9, it is preferable that the two-way valve 21 be opened.

The switching damper 44 which lies in the in-vehicle unit 42 is set so that the air sucked in from the air inlet/outlet port 43B passes through both inside air conditioning heat exchanger 7 and inside cooling heat exchanger 6 and blows off from the air inlet/outlet port 43A, as shown in FIG. 9. At this time, the inside fan 8B does not operate and hence does not suck in air from the air inlet/outlet port 43D. The air sucked in from the air inlet/outlet port 43B is heat-exchanged in the inside air conditioning heat exchanger 7, whereby it is dehumidified and cooled. Since the device cooling medium warmed by both intermediate heat exchanger 4 and heating units 9 is circulating through the inside cooling heat exchanger 6, the temperature of the air passing through the inside cooling heat exchanger 6 is raised.

In this way it becomes possible to carry out the room heating and dehumidifying operation. The air inlet/outlet port 43A communicates with the interior of the room (the interior of the vehicle) through a duct (not shown) to control the temperature of the interior of the room.

The temperature of the air blown off from the air inlet/outlet port 43A can be controlled by the air volume in the inside fan 8A, the flow rate in the circulating pump 5, the speed of revolutions of the compressor 1 and the degree of opening of the expansion valve 22B.

When the temperature of the blown-off air is lower than a target temperature, the air volume in the inside fan 8A, the flow rate in the circulating pump 5, the speed of revolutions of the compressor 1 and the degree of opening of the expansion valve 22B are all increased.

On the other hand, when the temperature of the blown-off air is higher than the target temperature, the air volume in the inside fan 8A, the flow rate in the circulating pump 5, the speed of revolutions of the compressor 1 and the degree of opening of the expansion valve 22B are all decreased. It is not necessary to control all of the actuators, but it suffices to control at least one actuator.

For example at the time of starting in winter when the outside air temperature is low, there sometimes is a case where it is preferable that the heating units 9 be warmed in advance. The device heating operation is an operation for warming the heating units 9 without inside air conditioning and will be described below with reference to FIG. 10.

[8. Device Heating Operation]

Figure 10:
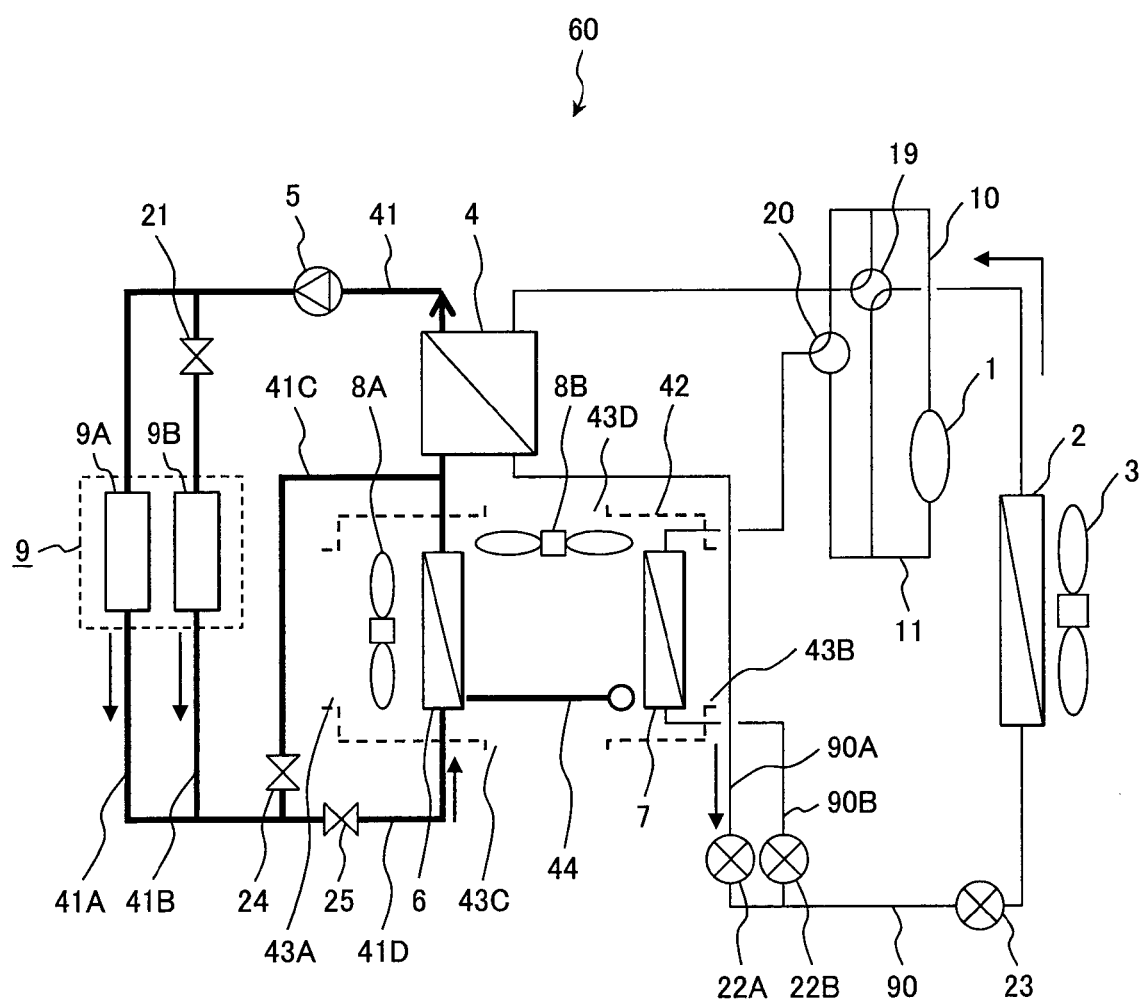
FIG. 10 is a diagram illustrating a heating operation.

In the device heating operation, as shown in FIG. 10, the four-way valve 19 and the three-way valve 20 are connected, the discharge pipe 10 of the compressor 1 is connected to both intermediate heat exchanger 4 and inside air conditioning heat exchanger 7, and the suction pipe 11 of the compressor 1 is connected to the outside heat exchanger 2. The expansion valve 22A is fully opened and the expansion valve 22B is fully closed to prevent the cooling medium for air conditioning from flowing to the inside air conditioning heat exchanger 7. That is, the intermediate heat exchanger 4 is used as a condenser and the outside heat exchanger 2 is used as an evaporator.

The cooling medium for air conditioning compressed by the compressor 1 is liquefied by heat dissipation in the intermediate heat exchanger 4, then passes through the expansion valve 22A which is fully open, and flows through the outside heat exchanger 2. The cooling medium for air conditioning flowing through the outside heat exchanger 2 is pressure-reduced in the expansion valve 23, becoming low in both temperature and pressure, then in the outside heat exchanger 2 the cooling medium for air conditioning evaporates by absorbing heat from the outside air and returns to the compressor 1. In the intermediate heat exchanger 4, the device cooling medium and the cooling medium for air conditioning are heat-exchanged with each other, whereby the device cooling medium is heated.

In the device cooling circuit 41, by closing the two-way valve 25 and opening the two-way valve 24, the device cooling medium is prevented from flowing through the inside cooling heat exchanger 6 under operation of the circulating pump 5. When the two-way valve 21 is closed, the device cooling medium flows through only the device cooling circuit 41A, while when the two-way valve 21 is opened, the device cooling medium flows through both device cooling circuits 41A and 41B. In order that the device cooling medium may flow to the heating units 9 to be heated, the two-way valve 21 is opened. The device cooling medium is heated by the refrigerating cycle circuit 90, so by circulating the device cooling medium it is possible to heat the heating units 9.

In the in-vehicle unit 42, air is neither sucked in nor discharged and the inside fans 8A and 8B are not operated. Since the device cooling medium and the cooling medium for air conditioning are not allowed to flow in the inside cooling heat exchanger and the inside air conditioning heat exchanger 7 respectively, heat exchange is not performed.

The heating quantity can be controlled by the flow rate in the circulating pump 5, the speed of revolutions of the compressor 1, the degree of opening of the expansion valve 23 and the air volume in the outside fan 3. The heating quantity can be increased by increasing the flow rate in the circulating pump 5, the speed of revolutions of the compressor 1, the degree of opening of the expansion valve 23 and the air volume in the outside fan 3. On the other hand, the heating quantity can be decreased by decreasing the flow rate in the circulating pump 5, the speed of revolutions of the compressor 1, the degree of opening of the expansion valve 23 and the air volume in the outside fan 3. It is not necessary to control all of the actuators, but it suffices to control at least one actuator.

In the room heating operation shown in FIG. 6 and in the device heating operation shown in FIG. 10, frosting to the outside heat exchanger 2 is unavoidable. The defrosting operation is an operation which is switched temporarily from the room heating operation and the device heating operation to defrost the outside heat exchanger 2. The defrosting operation will be described below with reference to FIG. 11.

[9. Defrosting Operation]

Figure 11:
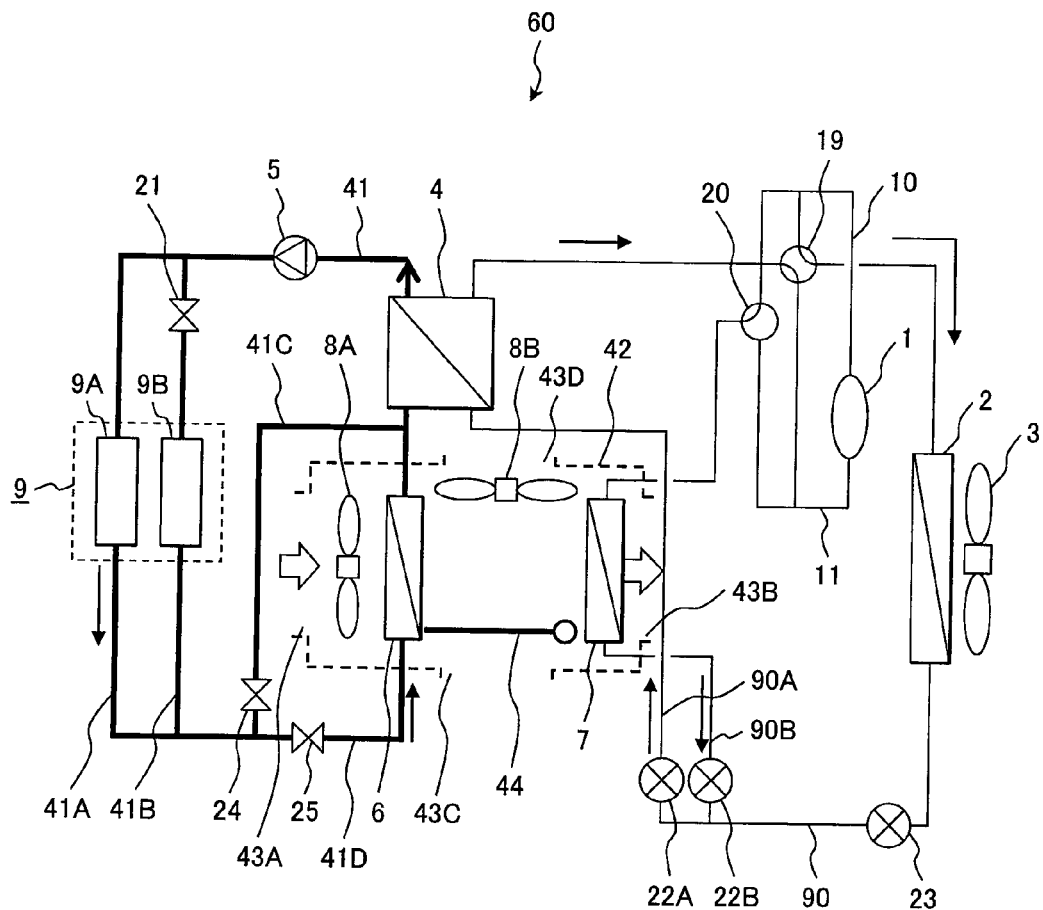
FIG. 11 is a diagram illustrating a defrosting operation.

In the defrosting operation, as shown in FIG. 11, the four-way valve 19 and the three-way valve 20 are connected, the discharge pipe of the compressor 1 is connected to both outside heat exchanger 2 and inside air conditioning heat exchanger 7, and the suction pipe 11 of the compressor 1 is connected to the intermediate heat exchanger 4. The expansion valves 23 and 22B are fully open. That is, the outside heat exchanger 2 and the inside air conditioning heat exchanger 7 are used as condensers and the intermediate heat exchanger 4 is used as an evaporator.

The cooling medium for air conditioning compressed by the compressor 1 is liquefied by heat dissipation in both outside heat exchanger 2 and inside air conditioning heat exchanger 7, then passes through the fully open expansion valves 22B and 23 and flows to the intermediate heat exchanger 4. In this way it is possible to remove the frost on the outside heat exchanger 2.

The cooling medium for air conditioning flowing through the intermediate heat exchanger 4 is pressure-reduced in the expansion valve 22A, becoming low in both temperature and pressure, then evaporates by heat dissipation in the intermediate heat exchanger 4 and returns to the compressor 1. In the intermediate heat exchanger 4, the device cooling medium and the cooling medium for air conditioning are heat-exchanged with each other, whereby the device cooling medium is cooled.

In the device cooling circuit 41, by closing the two-way valve 25 and opening the two-way valve 24, the device cooling medium is prevented from flowing through the inside cooling heat exchanger 6 under operation of the circulating pump 5. When the two-way valve 21 is closed, the device cooling medium flows through only the device cooling circuit 41A, while when the two-way valve 21 is opened, the device cooling medium flows through both device cooling circuits 41A and 41B. Since the device cooling medium is cooled by the refrigerating circuit 90, it is possible to cool the heating units 9 by circulating the device cooling medium.

The switching damper 44 which lies within the in-vehicle unit 42 is set so that the air sucked in from the air inlet/outlet port 43A passes through both inside cooling heat exchanger 6 and inside air conditioning heat exchanger 7 and blows off from the air inlet/outlet port 43B, as shown in FIG. 11. At this time, the inside fan 8B does not operate and hence does not suck in air from the air inlet/outlet port 43D. Since the device cooling medium is not circulating through the inside cooling heat exchanger 6, the temperature of the air passing through the inside cooling heat exchanger 6 does not change.

By heat exchange in the inside air conditioning heat exchanger 7 disposed on the downstream side, warmed air is blown off to the interior of the vehicle room from the air inlet/outlet port 43B. Thus, even in the defrosting operation, warm air can be blown off into the room. The air inlet/outlet port 43B communicates with the interior of the room (the interior of the vehicle) through a duct (not shown) to control the temperature of the interior of the room.

It is also possible to prevent warm air from blowing off to the interior of the vehicle room. This can be done by fully closing the expansion valve 22B and turning OFF the inside fans 8A and 8B in the construction described above.

The defrosting quantity can be controlled by the air volume in the inside fan 8A, the flow rate in the circulating pump 5, the speed of revolutions of the compressor 1, the degree of opening of the expansion valve 22A and the air volume in the outside fan 3.

The defrosting quantity can be increased by increasing the air volume in the inside fan 8A, the flow rate in the circulating pump 5, the speed of revolutions of the compressor 1, the degree of opening of the expansion valve 22A and the air volume in the outside fan 3.

On the other hand, the defrosting quantity can be decreased by decreasing the air volume in the inside fan 8A, the flow rate in the circulating pump 5, the speed of revolutions of the compressor 1, the degree of opening of the expansion valve 22A and the air volume in the outside fan 3. It is not necessary to control all of the actuators, but it suffices to control at least one actuator.

[In-Vehicle Unit]

In the operations described above, the flow of air in the in-vehicle unit 42 is switched according to operation modes. This is for the following reason.

Figure 12:
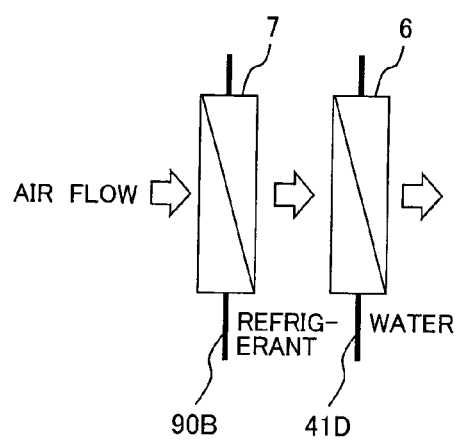
FIG. 12 is a diagram illustrating an air flow from an inside air conditioning heat exchanger to an inside cooling heat exchanger.

For dehumidifying, it is necessary that the air be cooled and dehumidified in the inside air conditioning heat exchanger 7 and then warmed in the inside cooling heat exchanger 6, as shown in FIG. 12. Consideration will now be given to the case where the room heating operation is performed utilizing the waste heat from the heating units 9 in the layout of heat exchangers shown in FIG. 12.

As shown in FIG. 12, when air is passed through the inside air conditioning heat exchanger 7 and the inside cooling heat exchanger 6 in this order, if the device cooling medium is not in a sufficiently warmed state, the temperature of the air warmed in the inside air conditioning heat exchanger 7 is reduced in the inside cooling heat exchanger 6. In the case where the temperature of the device cooling medium flowing through the inside cooling heat exchanger 6 is thus low, the two-way valve 24 is opened and the two-way valve 25 is closed to prevent the device cooling medium from flowing to the inside cooling heat exchanger 6. That is, it is impossible to carry out the room heating operation utilizing the waste heat.

Figure 13:
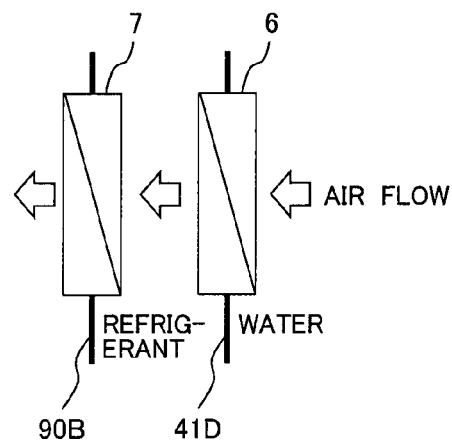
FIG. 13 is a diagram illustrating an air flow from the inside cooling heat exchanger to the inside air conditioning heat exchanger.

If this point is taken into account, it is preferable that the air be passed through the inside cooling heat exchanger 6 and the inside air conditioning heat exchanger 7 in this order, as shown in FIG. 13. This is because the air temperature can be further raised in the inside air conditioning heat exchanger 7 after raised with the device cooling medium in the inside cooling heat exchanger 6. If the temperature of the device cooling medium rises even a little by the heating units 9, it becomes possible to carry out the room heating operation utilizing the waste heat, whereby it becomes possible to reduce the consumption of energy in the air conditioning system.

When passing air as in FIG. 13, the dehumidifying operation cannot be done as described above. Therefore, the air flowing direction is switched according to operation modes. More specifically, in the dehumidifying operation and the room heating and dehumidifying operation, air is passed as in FIG. 12, while in the other operation modes air is passed as in FIG. 13.

Further, the switching damper 44 is installed so that the warm air heat-exchanged in the inside cooling heat exchanger 6 does not enter the interior of the vehicle when device cooling is performed as in FIGS. 3 and 5 and when the interior of the vehicle room is not to be warmed.

The following description is now provided about the air inlet/outlet ports 43A, 43B, 43C and 43D in the in-vehicle unit 42 shown in FIG. 2. In case of sucking in air, the air inlet/outlet ports 43A, 43B and 43C can suck in the inside air or the outside air through ducts (not shown), while in case of blowing off air, the air inlet/outlet ports 43A and 43B blow off air to the interior of the room (the interior of the vehicle) through ducts (not shown). The air to be blown off to the interior of the room can be switched for example toward the vehicle occupant's feet or toward the windshield, through ducts (not shown). In the air inlet/outlet port 43D is installed a duct (not shown) so that air is blown off to the exterior of the room (the exterior of the vehicle).

An example of the in-vehicle unit 42 which implements the above construction will be described below with reference to FIG. 14.

Figure 14:
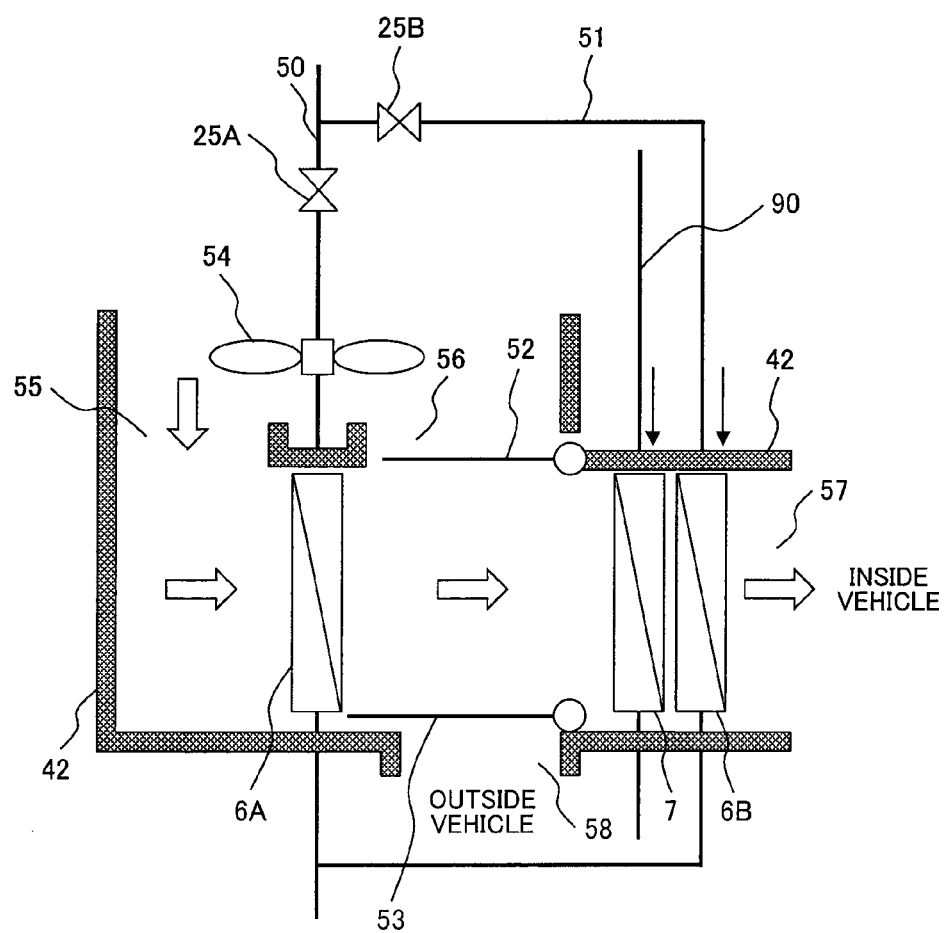
FIG. 14 is a diagram illustrating the construction of an in-vehicle unit (a first state)

As shown in FIG. 14, the in-vehicle unit 42 includes an inside cooling heat exchanger 6A as a first inside cooling heat exchanger with the device cooling medium flowing in the interior thereof for heat exchange with air, an inside cooling heat exchanger 6B as a second inside cooling heat exchanger, an inside air conditioning heat exchanger 7 with the cooling medium for air conditioning flowing in the interior thereof for heat exchange with air, an inside fan 54 for sucking air into the in-vehicle unit 42, switching dampers 52 and 53 for switching the flow of air in the interior of the in-vehicle unit 42, and two-way valves 25A and 25B as flow path switching means for controlling the flow of the device cooling medium toward the inside cooling heat exchangers 6A and 6B.

The inside cooling heat exchangers 6A and 6B are installed on upstream and downstream sides respectively of the inside air conditioning heat exchanger 7 and the switching dampers 52 and 53 are disposed between the inside air conditioning heat exchanger 7 and the inside cooling heat exchanger 6A. In the in-vehicle unit 42, air is sucked in from air suction ports 55, 56 and discharged from air discharge ports 57, 58, by means of the inside fan 54.

With ducts (not shown), the air suction ports 55 and 56 can suck in the inside air or the outside air. The air discharge port 57 blows off air to the interior of the room (the interior of the vehicle) through a duct (not shown), while the air discharge port 58 blows off air to the exterior of the room (the exterior of the vehicle) through a duct (not shown).

The degree of opening of the switching damper 52 can be controlled so as to be variable to control the amount of air to be sucked in from the air suction port 56. The air sucked in from the air suction port 56 passes through both inside air conditioning heat exchanger 7 and inside cooling heat exchanger 6B without passing through the inside cooling heat exchanger 6A and then blows off to the interior of the vehicle room from the air discharge port 57.

The switching damper 53 is set so that the air sucked in from the air suction port 55 passes through the inside cooling heat exchanger 6A and thereafter blows off to the exterior of the vehicle room from the air discharge port 58 or blows off to the interior of the vehicle room from the air discharge port 57.

By controlling opening and closing of the two-way valves 25A and 25B, the order of air passage through the inside cooling heat exchanger 6 and the inside air conditioning heat exchanger 7 can be switched, as described above in connection with FIGS. 12 and 13. More specifically, by opening the two-way valve 25A and closing the two-way valve 25B, the air sucked in from the air suction port 55 passes through the inside cooling heat exchanger 6A, then passes through the inside air conditioning heat exchanger 7 and is blown off from the air discharge port 57. By closing the two-way valve 25A and opening the two-way valve 25B, the air sucked in from the air suction port 55 passes through the inside air conditioning heat exchanger 7, then passes through the inside cooling heat exchanger 6B and is blown off from the air discharge port 57.

Next, the operation of the in-vehicle unit 42 will be described below with reference to FIGS. 14 to 16.

As shown in FIG. 14, the state in which the switching dampers 52 and 53 are set and the two-way valve 25A is closed and the two-way valve 25B open is a case where there are performed dehumidifying operation and room heating and dehumidifying operation. That is, the air sucked in from the air suction port 55 is heat-exchanged in the inside air conditioning heat exchanger 7, then is heat-exchanged in the inside cooling heat exchanger 6B and is blown off from the air discharge port 57.

Figure 15:
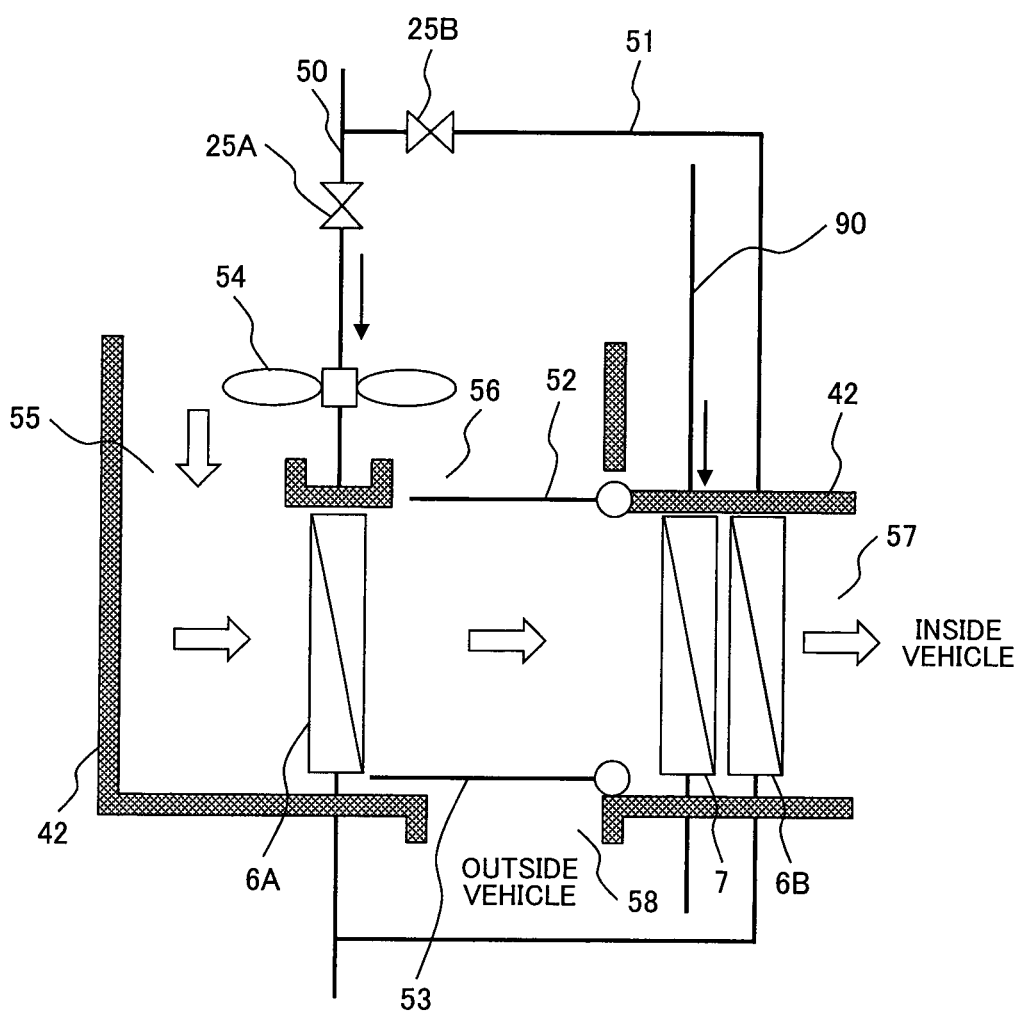
FIG. 15 is a diagram illustrating the construction of the in-vehicle unit (a second state)

As shown in FIG. 15, the state in which the switching dampers 52 and 53 are set and the two-way valve 25A is opened and the two-way valve 25B closed is a case where there are performed room cooling operation, room heating operation, room heating and device cooling operation, device heating operation, and defrosting operation. That is, the air sucked in from the air inlet/outlet port 55 is heat-exchanged in the inside cooling heat exchanger 6A, then is heat-exchanged in the inside air conditioning heat exchanger 7 and is blown off from the air discharge port 57.

In the room heating operation and the room heating and device cooling operation, if both two-way valves 25A and 25B are opened in FIG. 15, it is possible to effect heat exchange in both inside cooling heat exchangers 6A and 6B, so that the utilization of waste heat from the heating units 9 further increases, thus leading to reduction in energy consumption of the air conditioning system.

Figure 16:
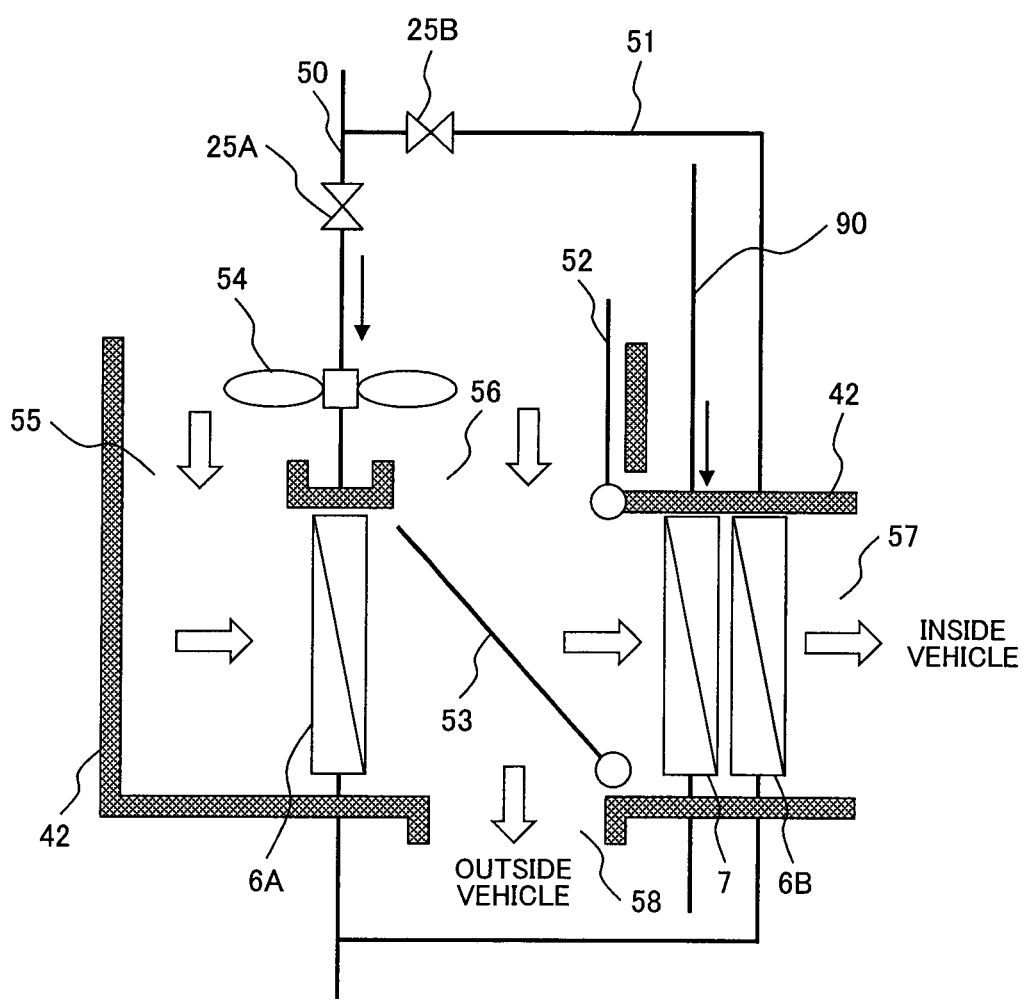
FIG. 16 is a diagram illustrating the construction of the in-vehicle unit (a third state)

As shown in FIG. 16, the state in which the switching dampers 52 and 53 are set and the two-way valve 25A is opened and the two-way valve 25B closed is a case where there are performed device cooling operation and room cooling and device cooling operation. That is, the air sucked in from the air suction port 55 is heat-exchanged in the inside cooling heat exchanger 6A, then is blown off from the air discharge port 58, while the air sucked in from the air suction port 56 is heat-exchanged in the inside air conditioning heat exchanger 7, then is blown off from the air discharge port 57.

Although a constructional example of the in-vehicle unit 42 has been described above, there may be adopted any other construction insofar as the construction adopted can afford the same effect as above.

[Conditions Related to Temperature-Controlled Objects]

The heating unit 9 provided in the device cooling circuit 41 is mounted on the vehicle and is necessary for adjusting the temperature to within a predetermined range in vehicular operation. Examples of the heating units 9 include a drive motor 73, an inverter 72 for driving the motor 73, a drive battery 76, and a deceleration mechanism (gear box 77) provided in the drive system.

In case of disposing the heating units 9 in the device cooling circuit 41 to make temperature control, it is necessary that the temperature control be done in accordance with temperature characteristics of the devices. FIG. 17 illustrates conditions related to objects to be temperature-controlled. As the objects to be temperature-controlled are mentioned the interior of the vehicle room and the heating units 9. As to the heating units 9, reference is made to the motor 73, inverter 72, battery 76 and gear box 77.

In air-conditioning the interior of the vehicle room, room cooling and heating, as well as dehumidifying, are suitably performed on the basis of, for example, temperature setting and outside air temperature. As will be described later, there is a case where room cooling is stopped or weakened to cool the heating units 9.

In a high torque output condition, the motor 73 and the inverter 72 generally become high in temperature. Therefore, a high torque output time is limited to prevent the temperature from rising above a predetermined level. By enhancing the cooling capacities of the motor 73 and the inverter 72 it becomes possible to prolong the high torque output time. The temperature of the device cooling medium circulating through the motor 73 and the inverter 72 is controlled to, for example, a temperature of not higher than 60° C.

In order to make the battery 76 exhibit its charge/discharge capacity to a satisfactory extent, that is, in order to improve its charge/discharge efficiency, it is preferable that the temperature of the battery 76 be maintained within a predetermined temperature range. Therefore, when the battery temperature is low (for example, at the time of starting at a low outside temperature), warm-up (device heating) is necessary, while when the battery temperature becomes too high due to the generation of heat from the battery itself, cooling is required.

Parallel gear trains in the gear box 77 are immersed in lubricating oil. The viscosity of lubricating oil in a case of the gear box 77 exerts an influence on a drive loss. When the lubricating oil temperature is low (for example, at the time of starting at a low outside temperature), an agitation loss, which is a loss created when gears agitate the lubricating oil, increases. Conversely, when the lubricating oil temperature is too high, the formation of oil film on gear mating surfaces is not done to a satisfactory extent, with consequent increase of friction loss. Thus, for example at the time of starting in winter, warm-up (device heating) is necessary, while when the lubricating oil temperature is high, it is necessary to promote heat dissipation from the gear box 77.

Figure 18:
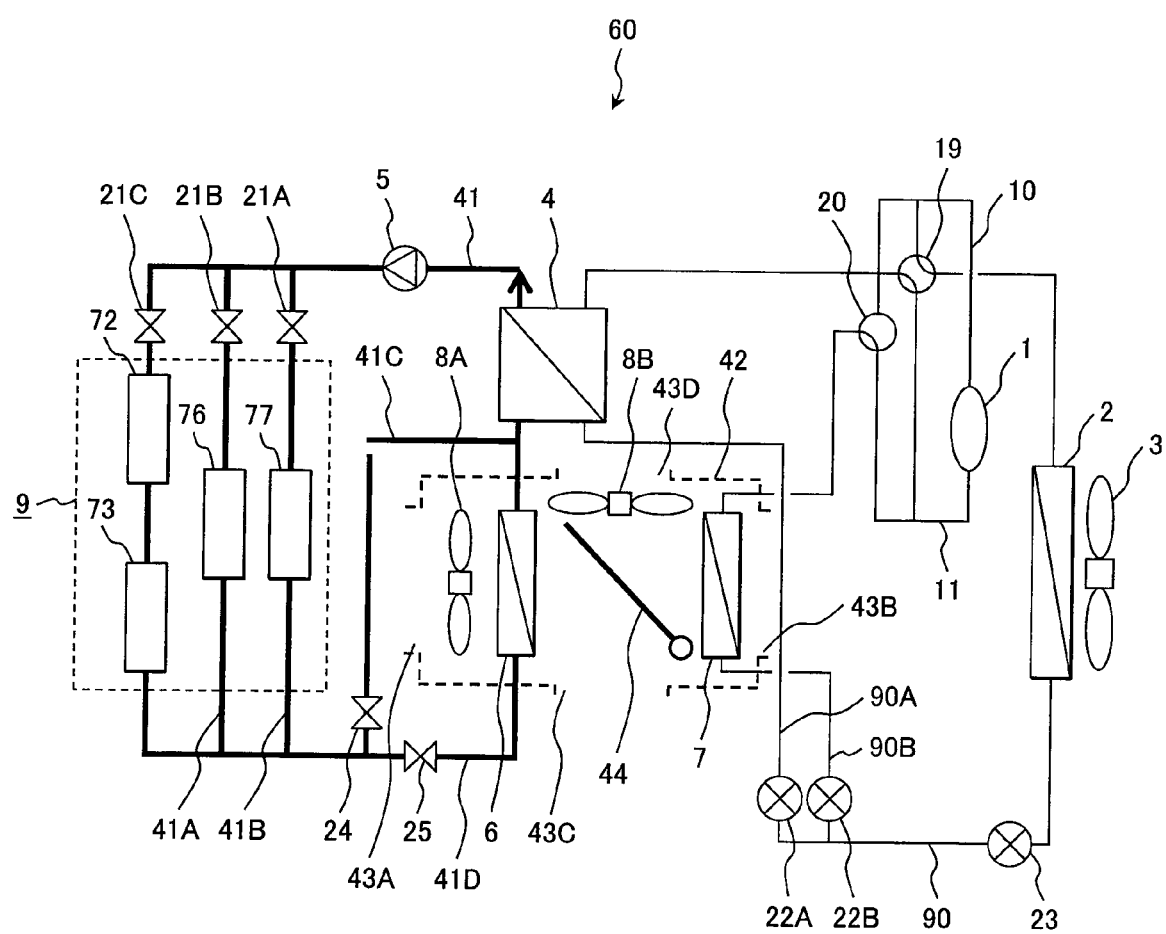
FIG. 18 is a diagram illustrating a case where plural heating units are arranged in parallel.
Figure 19:
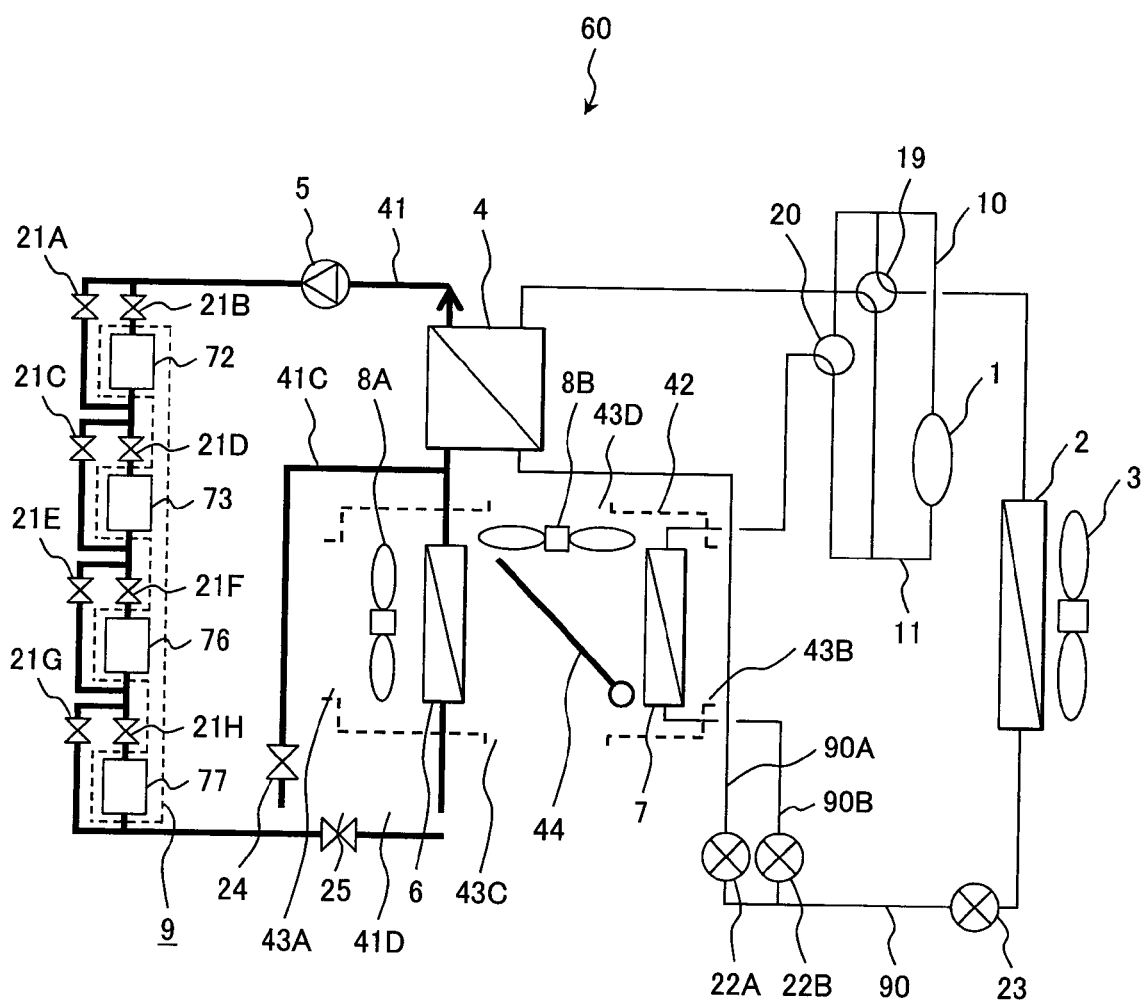
FIG. 19 is a diagram illustrating a case where plural heating units are arranged in series.

FIGS. 18 and 19 illustrate layouts of plural heating units 9. In case of using plural heating units in the device cooling circuit 41, there are a case where they are arranged in parallel as in FIG. 18 and a case where they are arranged in series as in FIG. 19.

In case of arranging plural heating units 9, the heating units 9 are arranged so that devices (battery 76, gear box 77) requiring warm-up and devices (inverter 72, motor 73) not requiring warm-up are in different circuits, as shown in FIG. 18. In the example of FIG. 18, a series line of inverter 72 and motor 73, a line of battery 76 alone, and a line of gear box 77 alone, are connected in parallel. On an inlet side of each line are provided two-way valves 21A, 21B and 21C. With such a layout, the temperature can be controlled to an optimum temperature at each line.

All the heating units may be arranged in parallel, which, however, cannot be said preferable because the number of parts increases. The battery 76 and the gear box 77 may be arranged in series, but such a parallel layout at separate lines as in the construction of FIG. 18 is preferred, considering an on-board condition such that generally the drive battery 76 is disposed under a seat and the gear box 77 is disposed near a drive shaft.

In case of arranging the heating units in series, they are arranged in such a manner that the lower the set temperature, the more upstream the position with respect to the flow of the device cooling medium, as shown in FIG. 19. Consideration will here be given about the case where the inverter 72, motor 73, battery 76 and gear box 77 are provided as heating units 9.

In this case, the inverter 72 is the lowest in set temperature and the motor 73, battery 76 and gear box 77 become higher in this order in set temperature. In FIG. 19, by providing two-way valves 21A to 21H, it is possible to prevent the device cooling medium from circulating through a specific heating unit 9. For example, by opening the two-way valve 21A and closing the two-way valve 21B, the device cooling medium is prevented from circulating through the inverter 72.

Limitation is not always made to the layout examples of heating units 9 shown in FIGS. 18 and 19. Another layout will do if there is obtained the same effect.

In this embodiment, by constructing the air conditioning apparatus 60 as above, the inside air conditioning and device cooling and heating for the heating units 9, including motor and inverter, can be controlled each individually. The air conditioning control unit 61 controls the air conditioning apparatus 60 so that the inside temperature and the temperatures of the devices requiring temperature control become respective set temperatures.

In the present invention, as shown in FIG. 1, the air conditioning control unit 61 inputs the vehicle operation information 64 (e.g., vehicle speed information, accelerator opening information) and the running plan information 65 and controls the air conditioning apparatus 60 on the basis of those information pieces plus the temperatures 63 of the devices requiring temperature control and the inside temperature 62.

For example, by predicting temperature changes with respect to the devices requiring temperature control and the interior of the vehicle room and by changing the temperatures set for the cooling medium for air conditioning and the device cooling medium beforehand on the basis of the prediction, cooling and warm-up of each device are performed efficiently and the device temperature is controlled to optimum.

[Flowchart]

Figure 20:
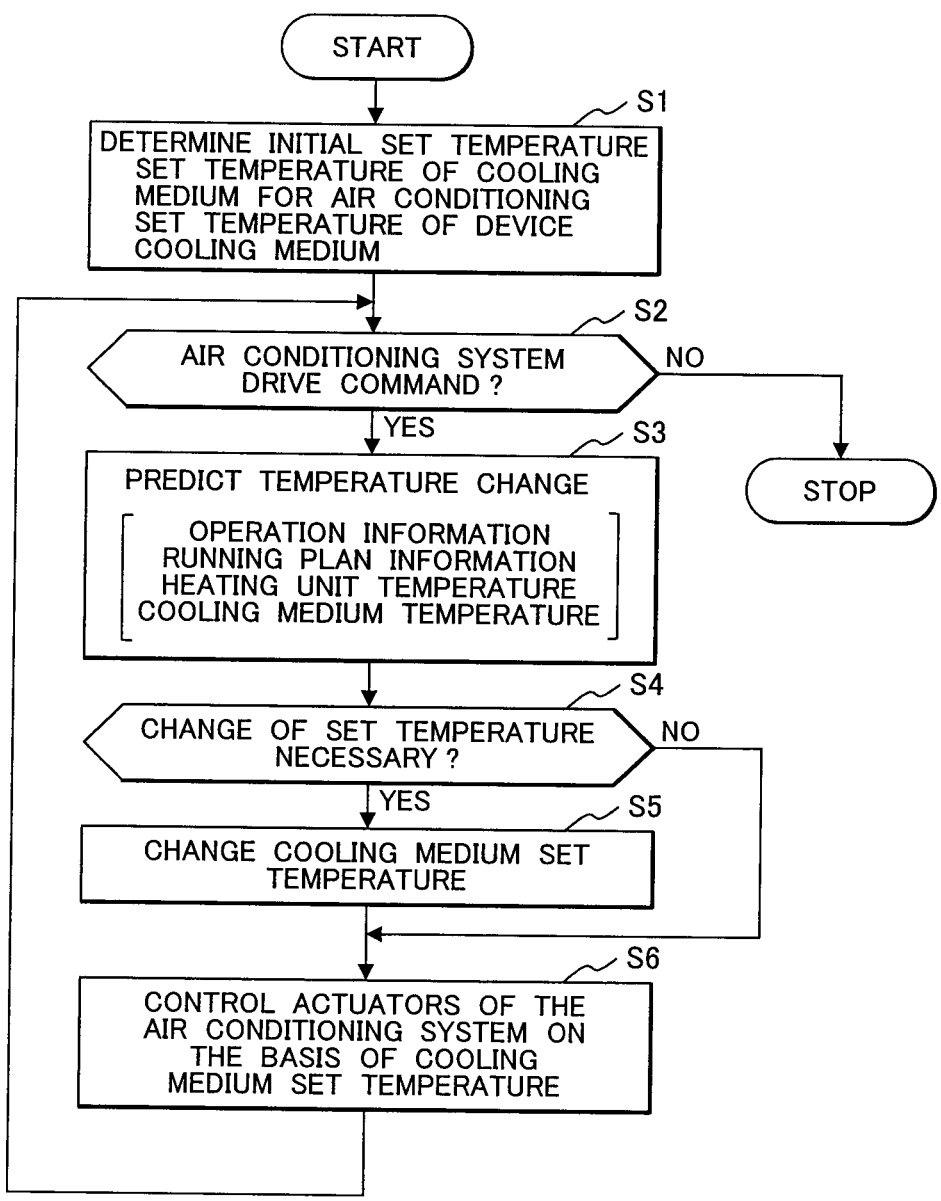
FIG. 20 is a flow chart showing a control processing program.

FIG. 20 is a flow chart showing a control processing program in the air conditioning control unit 61. A microcomputer provided in the air conditioning control unit 61 executes the processing steps shown in FIG. 20 in order by software processing. When the ignition key of the vehicle is turned ON, the microcomputer starts the program processing shown in FIG. 20.

In step S1, an initial set temperature of the cooling medium for air conditioning used in inside air conditioning and that of the device cooling medium used in cooling and heating each heating unit 9 are determined. For example, the initial set temperatures are temperatures considered appropriate when the outside temperature is a normal temperature and when the vehicle is running on a flat road at a predetermined speed.

In step S2, it is determined whether an air conditioning system drive command is present or not. In the construction in which the air conditioning system is turned ON or OFF by vehicle ON-OFF, whether an air conditioning system drive command is present or not is determined on the basis of whether a vehicle ON-OFF switch is ON or OFF. If the answer is NO in step S2, the program of FIG. 20 ends. On the other hand, if the answer is YES in step S2, the processing flow advances to step S3.

In step S3, temperature changes are predicted with respect to the vehicle room and the heating units 9, which are to be temperature-controlled, as well as the cooling medium for air conditioning and the device cooling medium, on the basis of at least one of the vehicle operation information 64, running plan information 65, detected temperatures of the heating units 9 and detected temperatures of the cooling mediums.

In step S4, on the basis of the predicted temperature changes in step S3 it is determined whether it is necessary to change the set temperatures of the cooling medium for air conditioning and the device cooling medium.

If it is determined in step S4 that the changes are necessary, the processing flow advances to step S5, in which the set temperatures of the cooling mediums are changed, then the processing flow advances to step S6. On other hand, if it is determined on the basis of calculated prediction temperatures that the changes are not necessary, the processing flow advances to step S6, skipping step S5.

In step S6, the actuators in the air conditioning apparatus 60 shown in FIG. 1 are controlled so as to change the present cooling medium temperatures on the basis of the changed set temperatures.

Although in the above description the temperatures set for the cooling mediums are changed in steps S4 to S6, the temperatures set for the heating units 9 (the interior of the vehicle room, the devices) may be changed.

[Vehicle Conditions and Set Temperature]

Next, with reference to FIG. 21, a description will be given about vehicle conditions and also about changing the set temperatures of the heating units 9 as devices requiring temperature control. The vehicle conditions are based on detected signals as the vehicle operation information 64 provided from an accelerator sensor and a vehicle speed sensor and the running plan information 65 provided from a navigation system.

In FIG. 21 there are described nine types of vehicle conditions, i.e., during charge; before running start; before take off; acceleration, deceleration, and before and during mounting path running; in ordinary road running; before and during expressway running; before temporary stop (e.g., waiting until the traffic light turns green, traffic congestion); before stop; during stop. However, no limitation is made to those vehicle conditions. As objects to be air-conditioned there are mentioned the interior of the vehicle room, motor, inverter, battery, and gear box.

Driver's intention (e.g., whether the driver wants acceleration or not) can be determined from the vehicle operation information 64 (vehicle speed and accelerator opening). The running plan information 65 comprises road information (the degree of traffic congestion, road gradient) up to a destination based on the navigation system and destination information. The amount of heat generated from the heating units 9 is predicted from motor output and inside air conditioning output both predicted from those information pieces, then the inside room set temperature and the set temperatures of the devices requiring temperature control are changed.

For example, when an intention of acceleration can be predicted from the vehicle operation information 64, the set temperatures of the motor and the inverter are made low to cool the motor and the inverter in advance. When mountain path running is predicted from the running plan information 65, the set temperatures of the motor and the inverter are made lower than initial settings. For example, the initial settings assume a general running on a flat road. Without changing the set temperature of the battery, warm-up or cooling is performed while controlling the flow of the device cooling medium so as to afford a predetermined temperature range which permits efficient charge and discharge. The set temperature of the gear box is not changed, either, and the recovery of waste heat is performed.

During charge, the set temperatures are not changed, but warm-up and cooling are controlled so that the battery temperature during charge falls under a predetermined temperature range. For the interior of the vehicle room, as well as the motor, inverter and gear box, room cooling and heating, and cooling and warm-up, are not performed.

Before running start, it is assumed that battery charge is performed using an AC power supply during vehicle parking. In this case, the interior of the vehicle room is cooled or heated beforehand using the AC power supply so that the interior of the vehicle room is in a comfortable temperature condition at the time of running start.

Before take off of the vehicle, in preparation for running which follows just after take off, the set temperatures of all the objects requiring temperature control are brought into a change-free state and there are performed cooling and warm-up of the battery and warm-up of the gear box. By warming up the battery and gear box before starting of the vehicle like before running start and before take off, there can be attained an efficiency improvement in vehicle running.

In ordinary road running as a vehicle condition, namely, in a standard vehicle condition, the set temperatures of all the objects requiring temperature control are brought into a change-free state.

Also before and during expressway running as vehicle conditions, like the mountain path running, the motor output becomes large and therefore there are adopted the same set temperatures and air conditioning control as in mountain path running.

In the state of a temporary stop such as when waiting until the traffic light turns green or at the time of traffic congestion, the heat generation from the motor and the inverter becomes smaller than in the state of vehicle running and the temperature does not rise even when the cooling power is smaller. Therefore, the set temperatures of the motor and the inverter are raised to weaken the cooling power. Consequently, energy saving can be attained. As to the set temperature of the battery, the temperature range is made wide.

In a state (before stop) in which stop of the vehicle is predicted from the running plan information, for example, upon arrival at the destination, the set temperatures of the motor, inverter and battery are made the same as those before the temporary stop. However, cooling and heating of the interior of the vehicle room, as well as cooling and warm-up of the gear box, are stopped in advance because it is predicted that the vehicle drive will be stopped, thereby attaining the saving of energy.

Further, at the time of vehicle stop, cooling and heating of the interior of the vehicle room, as well as cooling and warm-up of all the devices requiring temperature control, are stopped.

When the temperatures of the devices are close to the respective upper-limit temperatures in a state in which air conditioning of the interior of the vehicle room and cooling and warm-up of the devices are being performed, priority is given to cooling and warm-up of the devices rather than air conditioning of the interior of the vehicle room.

In the control which follows the flow chart of FIG. 20 described above, temperature changes are predicted in step S3 and the cooling temperatures (target temperatures) of the cooling mediums are changed on the basis of the results of the prediction. However, there may be adopted a method in which the vehicle conditions shown in FIG. 21 are predicted from the vehicle operation information 64 and the running plan information 65 and changing the set temperatures is determined directly from the results of the prediction.

[Control Units in Electric Car]

Figure 22:
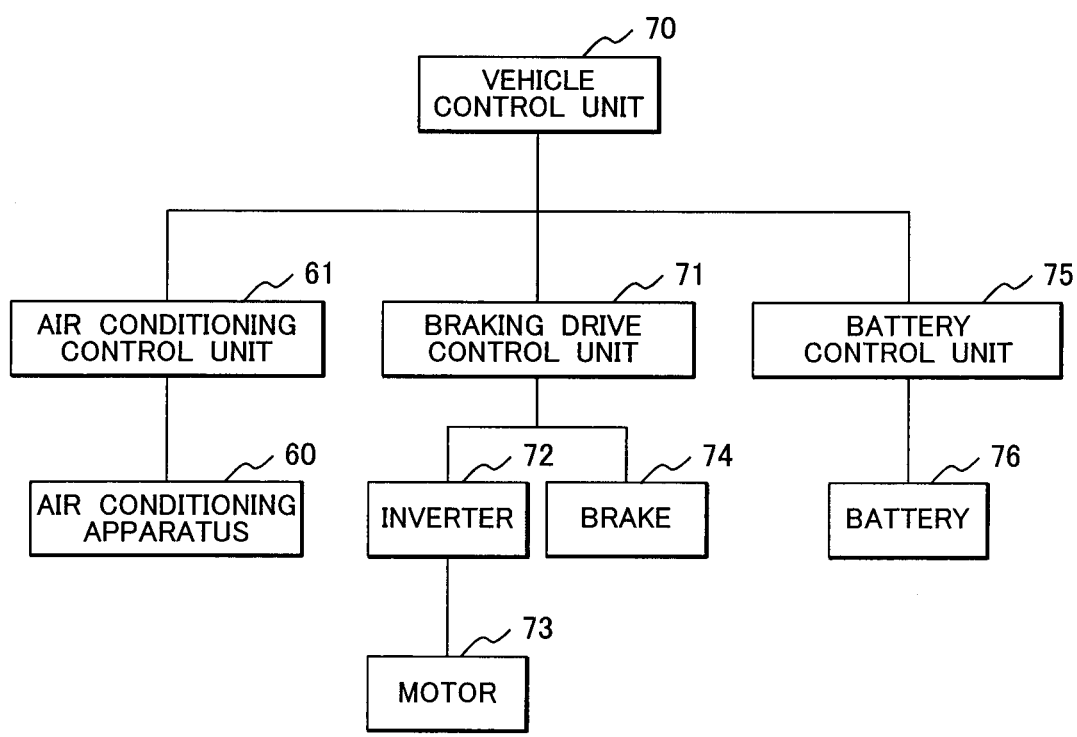
FIG. 22 is a diagram illustrating an outline of control units in an electric car.

Next, with reference to FIG. 22, a description will be given about the construction of control units in an electric car loaded with the vehicular air conditioning system of the present invention. Control units in the electric car comprise a vehicle control unit 70 for controlling the entire vehicle, an air conditioning control unit 61 for controlling the air conditioning apparatus 60, a braking drive control unit 71 for controlling braking drives of the motor 73, inverter 72 and brake 74, and a battery control unit 75 for controlling electric power of the battery 76. Other control units than these control units are also used, but descriptions thereof are omitted in this embodiment.

The air conditioning control unit 61 switches from one to another operation of the air conditioning apparatus 60 shown in FIGS. 3 to 11 and controls the temperatures of the cooling medium for air conditioning and the device cooling medium shown in FIG. 20. If the air conditioning control unit 61 is made integral with the whole or a part of the air conditioning apparatus 60, its mountability to the vehicle is improved.

By making the air conditioning control unit 61 integral with at least one of the vehicle control unit 70, braking drive control unit 71 and battery control unit 75 it is possible to omit the use of wiring between control units and a fixing jig for installation in the vehicle. Thus, such an integral structure is preferred.

The above embodiments may be used each alone or in combination. This is because the effects obtained in the embodiments can be attained each alone or synergistically. The present invention is not limited at all to the above embodiments insofar as the features of the present invention are not impaired.

What is claimed is:

1. A vehicular air conditioning system comprising:
   a refrigerating cycle circuit, the refrigerating cycle circuit comprising a compressor for compressing a cooling medium for air conditioning, an outside heat exchanger for heat exchange between the cooling medium for air conditioning and outside air, and an inside air conditioning heat exchanger for heat exchange with air to be blown off to the interior of a vehicle room, the compressor, the outside heat exchanger and the inside air conditioning heat exchanger being annularly connected in order;

a device cooling circuit, the device cooling circuit comprising a heating unit, at least one inside cooling heat exchanger for heat exchange with air to be blown off to the interior of the vehicle room, an intermediate heat exchanger for heat exchange between a device cooling medium for cooling the heating unit and the cooling medium for air conditioning present in the refrigerating cycle circuit, and a pump for circulating the device cooling medium;

a first flow path switch means for switchably connecting the outside heat exchanger and the intermediate heat exchanger to the discharge port or suction port of the compressor; and a second flow path switch means for switchably connecting the inside air conditioning heat exchanger to the discharge port or suction port of the compressor, wherein the heating unit, the at least one inside cooling heat exchanger the intermediate heat exchanger, and the pump are annularly connected, the intermediate heat exchanger being constructed such that one end of a piping of the cooling medium for air conditioning is connected to a liquid piping, the liquid piping providing connection between the outside heat exchanger and the inside air conditioning heat exchanger, and an opposite end of the piping of the cooling medium for air conditioning is connected to a suction port of the compressor, and the flow direction of the cooling medium of the outside heat exchanger, the inside air conditioning heat exchanger and the intermediate heat exchanger is changed through the first flow path switching means and the second flow path switching means.

2. A vehicular air conditioning system according to claim 1, wherein the inside air conditioning heat exchanger and the intermediate heat exchanger are each provided, in a piping route of the cooling medium for air conditioning connected to the liquid piping, with flow rate control means for air conditioning to make variable the flow rate of the cooling medium for air conditioning flowing to each of the heat exchangers and flow rate control means for cooling.

3. A vehicular air conditioning system according to claim 1, wherein outside flow rate control means for making variable the flow rate of the cooling medium for air conditioning is disposed in a piping route of the cooling medium for air conditioning, the piping route providing connection between the outside heat exchanger and the liquid piping.

4. A vehicular air conditioning system according to claim 1, wherein a case where the air to be blown off to the interior of the vehicle room passes through the at least one inside cooling heat exchanger after passing through the inside air conditioning heat exchanger and a case where the air to be blown off to the interior of the vehicle room passes through the inside air conditioning heat exchanger after passing through the at least one inside cooling heat exchanger can be switched from one to the other.

5. A vehicular air conditioning system according to claim 1, wherein a case where the air passing through the at least one inside cooling heat exchanger blows off to the interior of the vehicle room and a case where said air blows off to the exterior of the vehicle can be switched from one to the other.

6. A vehicular air conditioning system according to claim 1, wherein the device cooling circuit includes a main circuit with the device cooling medium flowing in the at least one inside cooling heat exchanger, a bypass circuit with the device cooling medium flowing while bypassing the at least one inside cooling heat exchanger, and flow rate control means for controlling the flow rate of the device cooling medium flowing in both the main circuit and the bypass circuit.

7. A vehicular air conditioning system according to claim 1, wherein, in device cooling for cooling the heating unit, a case where the device cooling medium circulating through the device cooling circuit is cooled by only the at least one inside cooling heat exchanger and a case where the device cooling medium is cooled by both the at least one inside cooling heat exchanger and the intermediate heat exchanger are switched from one to the other by controlling the degree of opening of the flow rate control means for cooling.

8. A vehicular air conditioning system according to claim 1, wherein in other cases than heating the interior of the vehicle room, the air passing through the at least one inside cooling heat exchanger is blown off to the exterior of the vehicle room.

9. A vehicular air conditioning system according to claim 6, wherein in a case of cooling the interior of the vehicle room the device cooling medium in the device cooling circuit is allowed to flow not through the main circuit but through the bypass circuit.

10. A vehicular air conditioning system according to claim 1, wherein in a room cooling operation, a room heating operation, a room heating and device cooling operation, and a defrosting operation, the air to be blown off to the interior of the vehicle room passes through the inside air conditioning heat exchanger after passing through the at least one inside cooling heat exchanger.

11. A vehicular air conditioning system according to claim 1, wherein in a dehumidifying operation and a room heating and dehumidifying operation, the air to be blown off to the interior of the room passes through the at least one inside cooling heat exchanger after passing through the inside air conditioning heat exchanger.

12. A vehicular air conditioning system according to claim 3, wherein in a device heating operation for heating the heating unit, the intermediate heat exchanger is used as a condenser and the degree of opening of the outside flow rate control means is controlled to control the temperature of the device cooling medium circulating through the device cooling circuit.

13. A vehicular air conditioning system according to claim 4, further comprising:

an in-vehicle unit, the in-vehicle unit comprising the at least one inside cooling heat exchanger, wherein
the at least one inside cooling heat exchanger includes a first inside cooling heat exchanger and a second inside cooling heat exchanger, and
the inside air conditioning heat exchanger, an inside fan for sucking in air, first and second switching dampers for switching the flow of air, and third and fourth flow path switching means for switching the flow of the device cooling medium to the first and second inside cooling heat exchangers.

14. A vehicular air conditioning system according to claim 13, wherein, in the in-vehicle unit, the first and second inside cooling heat exchangers are disposed on upstream side and downstream side respectively of the inside air conditioning heat exchanger, and the first and second switching dampers are disposed between the inside air conditioning heat exchanger and the first inside cooling heat exchanger.

15. A vehicular air conditioning system according to claim 13, wherein the in-vehicle unit includes first and second air suction ports for sucking in air and first and second air discharge ports for blowing off air, the first and second air suction ports being adapted to suck inside air or outside air, the first air discharge port being adapted to blow off air to the interior of the room, and the second air discharge port being adapted to blow off air to the exterior of the room.

16. A vehicular air conditioning system according to claim 15, wherein the first switching damper can adjust the amount of air to be sucked in from the second air suction port, and the air sucked in from the second air suction port passes through the inside air conditioning heat exchanger and the second inside cooling heat exchanger without passing through the first inside cooling heat exchanger and blows off from the first air discharge port.

17. A vehicular air conditioning system according to claim 15, wherein the second switching damper makes switching whether the air sucked in from the first air suction port is to be blown off from the second air discharge port or from the first air discharge port, after passing through the first inside cooling heat exchanger.

18. A vehicular air conditioning system according to claim 15, wherein in a dehumidifying operation and a room heating and dehumidifying operation, the air sucked in from the first air suction port is heat-exchanged in the inside air conditioning heat exchanger, thereafter is heat-exchanged in the second inside cooling heat exchanger and is blown off from the first air discharge port.

19. A vehicular air conditioning system according to claim 15, wherein in a room cooling operation, a room heating operation, a room heating and device cooling operation, a device heating operation and a defrosting operation, the air sucked in from the first air suction port is heat-exchanged in the first inside cooling heat exchanger, thereafter is heat-exchanged in the inside air conditioning heat exchanger and is blown off from the first air discharge port.

20. A vehicular air conditioning system according to claim 15, wherein in a device cooling operation and a room cooling and device cooling operation, the air sucked in from the first suction port is heat-exchanged in the first inside cooling heat exchanger and is thereafter blown off from the second air discharge port, while the air sucked in from the second air suction port is heat-exchanged in the inside air conditioning heat exchanger and is thereafter blown off from the first air discharge port.

* * * * *